US012723994B2

(12) United States Patent
Rothschild

(10) Patent No.: US 12,723,994 B2
(45) Date of Patent: Sep. 1, 2026

(54) TARGET X-RAY INSPECTION SYSTEM AND METHOD

(71) Applicant: Viken Detection Corporation, Burlington, MA (US)

(72) Inventor: Peter J. Rothschild, Newton, MA (US)

(73) Assignee: Viken Detection Corporation, Burlington, MA (US)

( * ) Notice: Subject to any disclaimer, the term of this patent is extended or adjusted under 35 U.S.C. 154(b) by 173 days.

(21) Appl. No.: 18/172,800

(22) Filed: Feb. 22, 2023

(65) Prior Publication Data

US 2023/0236140 A1 Jul. 27, 2023

Related U.S. Application Data

(63) Continuation-in-part of application No. PCT/US2021/072141, filed on Oct. 29, 2021.

(Continued)

(51) Int. Cl.
*G01N 23/10* (2018.01)
*G01N 23/083* (2018.01)

(Continued)

(52) U.S. Cl.
CPC ........... *G01N 23/10* (2013.01); *G01N 23/083* (2013.01); *G01N 23/18* (2013.01); *G01N 23/203* (2013.01);

(Continued)

(58) Field of Classification Search
CPC ........ G01N 23/04; G01N 23/10; G01N 23/18; G01N 23/203; G01N 2223/03;

(Continued)

(56) References Cited

U.S. PATENT DOCUMENTS 4,031,401 A 6/1977 Jacob
4,242,583 A 12/1980 Annis et al.

(Continued)

FOREIGN PATENT DOCUMENTS

CN 201340400 Y 11/2009
CN 203 444 121 U 2/2014

(Continued)

OTHER PUBLICATIONS

Notification Concerning Transmittal of International Preliminary Report on Patentability, issued from the International Bureau, mailed on May 11, 2023, in International Application No. PCT/US2021/072141, filed on Oct. 29, 2021, 9 pages.

(Continued)

*Primary Examiner* — David J Makiya
*Assistant Examiner* — Miya Downing
(74) *Attorney, Agent, or Firm* — Merchant & Gould P.C.

(57) ABSTRACT

A target inspection system includes a portable x-ray scanner configured to output a scanning beam of x-rays, a transmission detector module to detect x-rays of the scanning beam of x-rays that are transmitted through a target when the target is interposed between the portable x-ray scanner and the transmission detector module, and a coupling arm configured to couple the portable x-ray scanner to the transmission detector module mechanically to form a target inspection assembly, via a mechanical coupling between the coupling arm and the portable x-ray scanner at a proximal end of the coupling arm, and via a mechanical coupling between the coupling arm and the transmission detector module at a distal end of the coupling arm. The transmission detector module and the portable x-ray scanner are mechanically coupled together via the coupling arm, defining an opening to receive the target to be interposed therebetween for an x-ray scanning operation.

34 Claims, 22 Drawing Sheets

Related U.S. Application Data

(60) Provisional application No. 63/363,947, filed on Apr. 29, 2022, provisional application No. 63/268,422, filed on Feb. 23, 2022, provisional application No. 63/107,783, filed on Oct. 30, 2020.

(51) Int. Cl.
*G01N 23/18* (2018.01)
*G01N 23/203* (2006.01)
*G01V 5/222* (2024.01)

(52) U.S. Cl.
CPC ....... *G01V 5/222* (2024.01); *G01N 2223/301* (2013.01); *G01N 2223/33* (2013.01); *G01N 2223/505* (2013.01); *G01N 2223/646* (2013.01)

(58) Field of Classification Search
CPC ..... G01N 2223/301; G01N 2223/3303; G01N 2223/505; G01N 2223/628; G01V 5/00
See application file for complete search history.

(56) References Cited

U.S. PATENT DOCUMENTS 4,260,898 A 4/1981 Annis
4,315,146 A 2/1982 Rudin
4,342,914 A 8/1982 Bjorkholm
4,472,822 A 9/1984 Swift
4,503,332 A 3/1985 Annis
4,646,339 A 2/1987 Rice
4,799,247 A 1/1989 Annis et al.
4,809,312 A 2/1989 Annis
5,022,062 A 6/1991 Annis
5,103,099 A 4/1992 Bourdinaud et al.
5,179,581 A 1/1993 Annis
5,181,234 A 1/1993 Smith
5,224,144 A 6/1993 Annis
5,391,878 A 2/1995 Petroff
5,493,176 A * 2/1996 Persyk .................... H01J 43/28 313/532
5,666,393 A 9/1997 Annis
5,692,028 A 11/1997 Geus et al.
5,764,683 A 6/1998 Swift et al.
5,783,829 A 7/1998 Sealock et al.
5,903,623 A 5/1999 Swift et al.
6,078,052 A 6/2000 DiFilippo
6,252,929 B1 6/2001 Swift et al.
6,292,533 B1 9/2001 Swift et al.
6,434,219 B1 8/2002 Rothschild et al.
6,461,040 B1 10/2002 Mattson et al.
6,525,320 B1 2/2003 Juni
7,099,434 B2 8/2006 Adams et al.
7,115,875 B1 10/2006 Worstell
7,218,704 B1 5/2007 Adams et al.
7,310,407 B2 12/2007 Juni
7,593,510 B2 9/2009 Rothschild
D724,716 S 3/2015 Guo
9,146,201 B2 9/2015 Schubert et al.
9,285,488 B2 3/2016 Arodzero et al.
10,762,998 B2 9/2020 Rothschild
10,762,999 B2 9/2020 Kaszuba et al.
10,770,195 B2 9/2020 Rothschild
10,794,843 B2 10/2020 Rothschild et al.
11,200,998 B2 12/2021 Rothschild
11,448,606 B2 9/2022 Rothschild et al.
11,579,327 B2 2/2023 Couture et al.
2001/0016028 A1 8/2001 Adams et al.
2004/0017888 A1 1/2004 Seppi et al.
2005/0200802 A1* 9/2005 Kidouchim .............. G02C 9/02 351/41
2006/0083354 A1 4/2006 Tybinkowski et al.
2006/0109958 A1* 5/2006 Ertel ...................... A61B 6/547 378/205
2009/0086907 A1 4/2009 Smith
2009/0103686 A1 4/2009 Rothschild
2011/0058644 A1 3/2011 Thran et al.
2011/0103548 A1 5/2011 Bendahan
2012/0057670 A1 3/2012 Luhta et al.
2012/0076264 A1 3/2012 Ohta et al.
2012/0236990 A1 9/2012 Rothschild
2012/0263276 A1 10/2012 Schubert et al.
2013/0134930 A1 5/2013 Konkle et al.
2013/0195248 A1* 8/2013 Rothschild ........... G01N 23/203 378/86
2013/0202089 A1 8/2013 Schubert et al.
2013/0208850 A1 8/2013 Schmitt
2013/0208857 A1 8/2013 Arodzero et al.
2013/0315368 A1 11/2013 Turner
2015/0024080 A1 1/2015 Jacob et al.
2016/0070006 A1 3/2016 Konkle et al.
2017/0052125 A1 2/2017 Georgeson et al.
2017/0332986 A1 11/2017 Grondin et al.
2017/0358380 A1 12/2017 Rothschild
2018/0294066 A1 10/2018 Rothschild
2019/0043633 A2 2/2019 Rothschild
2019/0242834 A1 8/2019 Rothschild et al.
2019/0302037 A1* 10/2019 Safai ...................... G01N 23/02
2019/0346382 A1 11/2019 Rothschild
2020/0326291 A1 10/2020 Rothschild et al.
2021/0005340 A1 1/2021 Rothschild
2021/0074445 A1 3/2021 Rothschild
2021/0190705 A1 6/2021 May et al.
2022/0003693 A1 1/2022 Rothschild
2022/0091054 A1 3/2022 Rothschild et al.
2022/0099599 A1* 3/2022 Venkatachalam ....... G06T 7/001

FOREIGN PATENT DOCUMENTS

EP 2 659 838 A1 11/2013
EP 2667184 A1 11/2013
WO 2015/024080 A1 2/2015
WO 2016/0811881 A1 5/2016

OTHER PUBLICATIONS

PCT International Search Report and Written Opinion, mailed on Feb. 18, 2022 in International Application No. PCT/US2021/072141, filed Oct. 29, 2021, 12 pages.
PCT International Search Report and Written Opinion, mailed on May 10, 2023 in International Application No. PCT/US2023/063023, filed Feb. 22, 2023, 24 pages.

* cited by examiner

ROTATIONAL ACTUATOR
1292
1040
1010
102

106
MOUNTING
BRACKET
1360
108

COUPLING
MEMBER
1310
MAIN
PORTION
1356
MOUNTING
BRACKET
1358
RIGID, U-SHAPED
BRACKET COUPLING MEMBER
1210
TRANSMISSION
DETECTOR
MODULE
1206
116
COUPLING MOTION
1248
DECOUPLING MOTION
1249
END
1251

TARGET X-RAY INSPECTION SYSTEM AND METHOD

RELATED APPLICATIONS

This Application is a Continuation-In-Part of International Application No. PCT/US2021/072141, filed on Oct. 29, 2021, which claims the benefit of U.S. Provisional Application No. 63/107,783, filed on Oct. 30, 2020, and this Application also claims the benefit of U.S. Provisional Application No. 63/363,947, filed on Apr. 29, 2022, and of U.S. Provisional Application No. 63/268,422, filed Feb. 23, 2022. The entire teachings of the above applications are incorporated herein by reference.

BACKGROUND

X-ray backscatter imaging has been used for detecting concealed contraband, such as drugs, explosives, and weapons, since the late 1980's. Unlike traditional transmission x-ray imaging that creates images by detecting the x-rays penetrating through a target object, backscatter imaging uses reflected or scattered x-rays to create the image.

An example disk chopper wheel that creates the scanning pencil beam used in a backscatter x-ray imaging instrument may include a rotating tungsten outer disk, typically with an aluminum inner hub, with the tungsten outer disk defining one or more radial slits. A fan beam of x-rays can be incident on the disk chopper wheel, illuminating a strip on one side of the disk. Only one of the radial slits may be illuminated at any given time, allowing a scanning pencil beam of x-rays to pass through the slit.

A scanning pencil beam used for x-ray backscatter imaging can also be used to simultaneously create a transmission image with a transmission detector present.

SUMMARY

In the last few years, handheld X-ray backscatter imaging devices have been introduced into the market, enabling an operator to inspect suspect vehicles, packages, or other objects conveniently for security or contraband interdiction purposes. These devices have been designed to be relatively compact and lightweight, allowing them to be easily operated by a single individual for extended periods of time.

One of the potential applications for handheld X-ray backscatter imaging devices is to detect corrosion under insulation on metal pipes. This corrosion is a serious and largely unsolved problem affecting the entire global oil and gas industry and many other chemical or industrial plants utilizing insulated piping. While backscatter imaging can be useful for detecting moisture in the overlying insulation, which is usually a necessary precursor for corrosion on the pipe, the presence of the corrosion itself is often not detectable in the backscatter image.

Instead of using backscatter imaging for pipe inspection, traditional x-ray transmission imaging is typically used. By placing a transmission detector on the far side of the pipe, the intensity of the x-rays from a stationary cone-shaped x-ray beam that are transmitted through the pipe can be detected. In the case of the transmission image, the corrosion is typically much easier to detect, as the wall of the pipe has undergone significant thinning through the corrosion process.

A major drawback of using traditional x-ray transmission imaging for pipe inspection is the requirement that a transmission detector or x-ray film must be placed on a far (distal) side of the pipe from an x-ray beam scanning device on a near (proximal) side of the pipe. Also, the transmission detector or x-ray film must be aligned with the x-ray beam before the acquisition of each image. In a cluttered environment such as a petrochemical plant, access to the far side of the pipe is often limited, and performing traditional transmission imaging with a cone beam x-ray source on one side of the pipe and film or a flat-panel detector on the far side of the pipe is often not practical and can be very time consuming to set up.

Embodiments disclosed herein can allow a compact handheld, or otherwise portable backscatter imager to be easily adapted to acquire transmission images of insulated pipes rapidly, allowing a presence of corrosion under the insulation to be detected. It should be understood that all target objects other than pipes are fully within the scope of the invention. One of the advantages of a backscatter imager is that it uses a scanning pencil beam of x-rays, rather than a fan beam or cone beam of X-rays, resulting in much lower radiation exposure to an operator who may operate the handheld imager. Another advantage of using a scanning pencil beam for transmission detection is that the transmission detector can be a single-channel, unsegmented detector, which can be low-cost and rugged, and which has no stringent alignment requirements with the incident scanning x-ray beam. For example, a scanning x-ray pencil beam can be approximately five millimeters wide after traversing the pipe, allowing a one-centimeter wide detector to intercept the beam without requiring a stringent-tolerance fixture to be attached it to the imager.

In one embodiment, a pipe inspection system includes:

a) a portable x-ray scanner configured to output a scanning beam of x-rays;

b) a transmission detector module configured to detect x-rays of the scanning beam of x-rays that are transmitted through a pipe;

c) a coupling member configured to couple the portable x-ray scanner to the transmission detector mechanically to form a pipe inspection assembly; and d) a motion constraint feature configured to constrain motion of the pipe inspection assembly with respect to the pipe in a radial direction of the pipe, wherein the motion constraint feature is further configured to permit translational motion of the pipe inspection assembly in an axial direction of the pipe.

In another embodiment, a method of pipe inspection includes:

a) mechanically coupling a portable x-ray scanner to a transmission detector module to form a pipe inspection assembly;

b) constraining motion of the pipe inspection assembly with respect to a pipe in a radial direction of the pipe;

c) outputting a scanning beam of x-rays from the portable x-ray scanner; and d) detecting, using the transmission detector module, x-rays of the scanning beam that are transmitted through the pipe.

In a further embodiment beyond the system embodiment summarized above, a pipe inspection system includes:

a) means for mechanically coupling a portable x-ray scanner to a transmission detector module to form a pipe inspection assembly;

b) means for constraining motion of the pipe inspection assembly with respect to a pipe in a radial direction of the pipe;

c) means for outputting a scanning beam of x-rays from the x-ray scanner; and d) means for detecting, using the transmission detector module, x-rays of the scanning beam that are transmitted through the pipe.

Figures 1A, 1B:
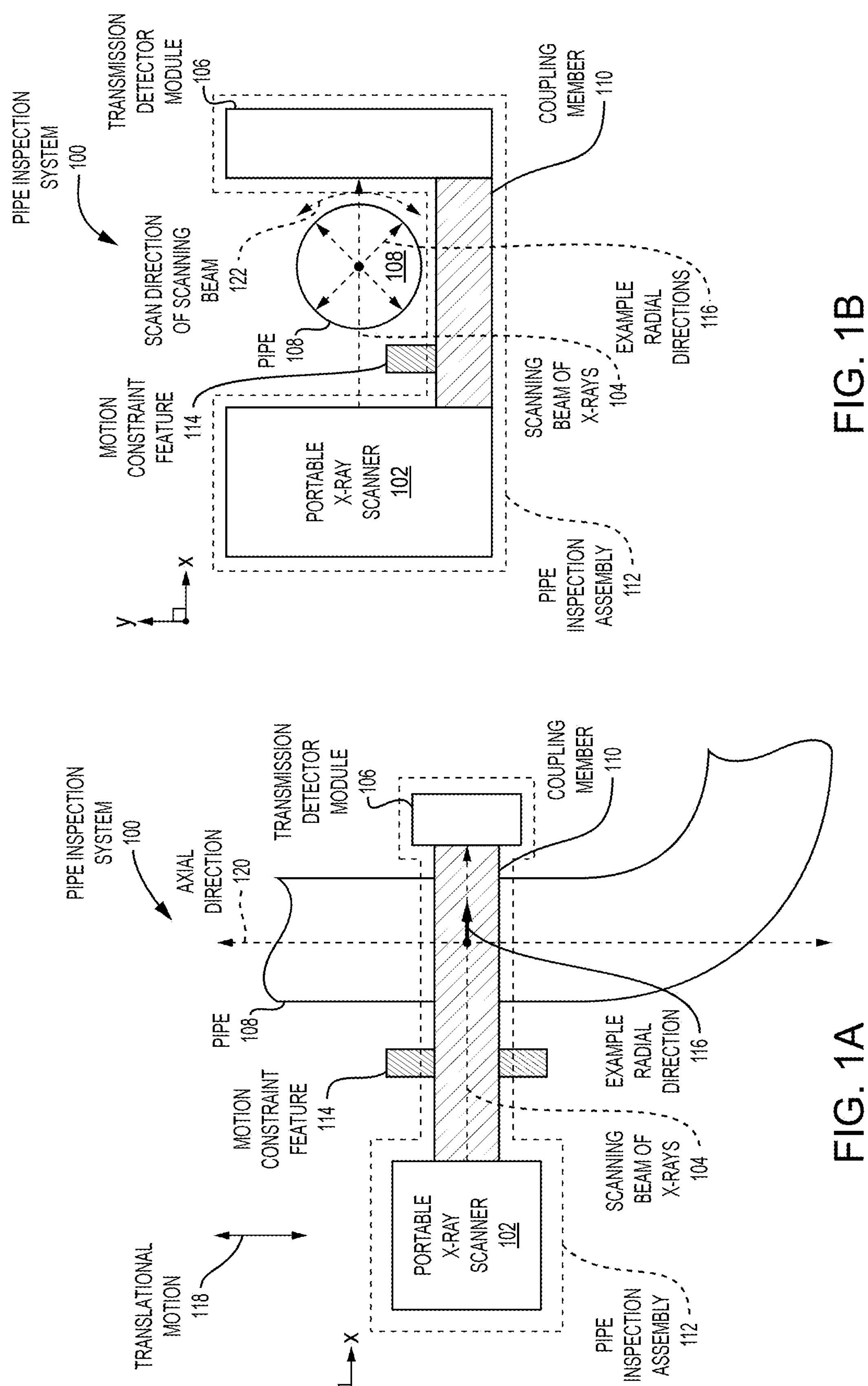
FIG. 1A is a schematic block diagram illustrating an embodiment pipe inspection system based on x-ray transmission imaging with a scanning x-ray beam, viewed along a radial direction of the pipe.
FIG. 1B is a schematic block diagram illustrating the pipe inspection system of FIG. 1A, viewed in an axial direction of the pipe.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

FIG. 1A is a schematic block diagram illustrating a general embodiment pipe inspection system 100. The pipe inspection system 100, which may also be referred to herein as an "x-ray pipe inspection system," includes a portable x-ray scanner 102 that is configured to output a scanning beam of x-rays 104. A "scanning beam of x-rays," as used herein, denotes generally an x-ray beam whose direction changes with time in a regular, periodic manner during operation. Those of skill in the art of backscatter x-ray imaging, for example, will understand that a scanning pencil beam as used in x-ray backscatter imaging is an example of a "scanning beam of x-rays," as used herein. A scanning beam is in contrast to a stationary x-ray beam such as a stationary cone beam traditionally used for transmission x-ray imaging.

Scanning pencil beams have also been previously used for transmission imaging, in which x-rays that are transmitted through a target object are detected as a function of beam scan position. However, as will be described hereinafter, embodiments described herein combine use of a scanning beam of x-rays, with transmission x-ray detection, with other particular system features that enable and improve pipe inspection in a novel and significantly improved manner compared with existing pipe inspection.

The pipe inspection system 100 also includes a transmission detector module that is configured to detect x-rays of the scanning beam 104 that are transmitted through a pipe 108. The system also includes a coupling member 110 that is configured to couple the portable x-ray scanner 102 to the transmission detector 106 mechanically to form a pipe inspection assembly 112.

The system 100 further includes a motion constraint feature 114 that is configured to constrain motion of the pipe inspection assembly 112 with respect to the pipe 108 in a radial direction of the pipe. An example radial direction 116 is illustrated, pointing in the X direction denoted by the axes illustrated in FIG. 1A. Nonetheless, other example radial directions include directions that lie in an XY plane according to the Cartesian coordinate system illustrated in the figure. The motion constraint feature 114 is further configured to permit translational motion of the pipe inspection assembly 112 in an axial direction 120 of the pipe 108. It is apparent that the pipe 108 includes a curved portion toward the bottom of the illustration. Nonetheless, the axial direction 120 may be well understood at a location in which the scanning beam of x-rays 104 intersects with the pipe 108 during active operation of the pipe inspection system 100. Thus, it will be understood that the axial direction of the pipe can change depending on the position at which the pipe inspection system 100 is configured to inspect.

Still referring to FIG. 1A, it should be understood that the section lines that are used in the illustration of FIG. 1A for the motion constraint feature 114 and the coupling member 110 are for convenience of illustration and distinguishing the features only, and do not necessarily denote a cut cross-sectional view in the usual manner of mechanical illustration. Furthermore, it is emphasized that the coupling member 110 and the motion constraint feature 114 that are illustrated in FIG. 1 are schematic and do not represent shapes in all embodiments, as will be illustrated and described hereinafter. Further, the pipe inspection system 100 does not include the pipe 108, which is the target object to be inspected. Instead, the pipe inspection system 100 includes only the portable x-ray scanner 102, and the transmission detector module 106, coupled by the coupling member 110 to form the pipe inspection assembly 112, together with the motion constraint feature 114, as it pertains to FIG. 1A. Similarly, in other drawings throughout the application that are described hereinafter, it should be understood that the pipe illustrated in the drawings, if any, is not part of the noted pipe inspection systems that are illustrated and described.

As used herein, a "motion constraints feature" may also be referred to as a "radial motion constraint feature," since this feature is configured to constrain motion in a radial direction with respect to the pipe 108. As with the axial direction, the radial direction may be evaluated at a position where the scanning beam of x-rays 104 intersects with the pipe 108. As noted previously, there are a variety of radial directions, and the example radial direction 116 is by way of example only. In principle, there are an infinite number of radial directions in the XY plane defined by the Cartesian coordinate system that is shown, which intersects at a right angle with the page of the figure.

As used herein, "radial motion constraint feature" denotes that radial motion of the pipe inspection assembly 112 with respect to the pipe is limited or controlled to some degree by features of the system, such that a position of the pipe inspection assembly 112 with respect to the pipe is limited or controlled in some manner such that scanning can be reliably performed, with an appropriate degree of alignment between the portable x-ray scanner and the transmission detector module, as the pipe inspection assembly 112 is translated with a translational motion 118 in the axial direction 120 of the pipe in order to scan over various locations of the pipe 108. Advantageously, embodiment systems increase the alignment tolerance, such that precise alignment is less necessary, and sufficient alignment for consistent scanning operation can be ensured with minimal effort and greater ease.

Figures 2, 3:
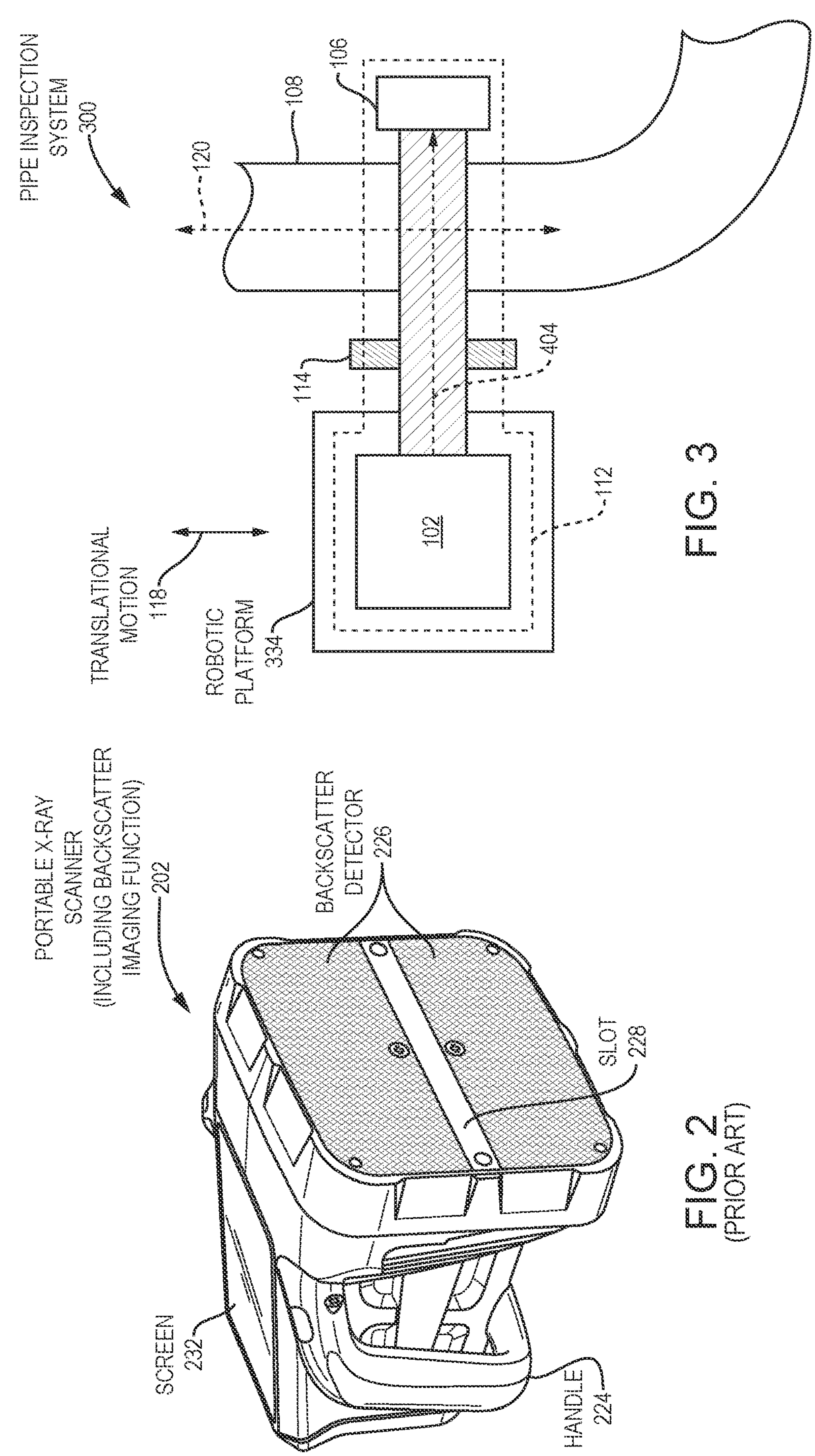
FIG. 2 (prior art) is a perspective-view illustration of an existing handheld backscatter imaging device manufactured by Viken Detection™ Corp. that may be used for its features as a portable x-ray scanner in embodiment pipe inspection systems, and also includes additional features for optional backscatter imaging.
FIG. 3 is a schematic block diagram illustrating use of an embodiment pipe inspection system in connection with a robotic platform, as an alternative to handheld operation.

In some embodiments, this consistent scanning performance is enabled by motion constraint features when the portable x-ray scanner 102 is a handheld scanner, such as that illustrated in FIG. 2. In other cases, the motion constraint feature 114, and various embodiments of motion constraint features described hereinafter, ensure consistent operation and adequate alignment when the portable x-ray scanner 102 is implemented on a robotic system that moves the portable x-ray scanner and pipe inspection assembly 112 with the translational motion 118, as illustrated in FIG. 3.

In all embodiments described herein, the motion constraint feature is further configured to permit the translational motion 118 of the pipe inspection assembly 112 in the axial direction 120 of the pipe. Thus, any motion constraints provided by the motion constraint feature 114 in the axial directions is sufficiently limited such that the translational motion 118 may be allowed.

In some embodiments, systems further include, affirmatively, other features, whether of the motion constraint feature 114 or other portions of the system, that facilitate the translational motion of the pipe inspection assembly 112 in the axial direction of the pipe. For example, rollers are illustrated and/or described in connection with FIGS. 14A-14D, and such rollers can be replaced or supplemented by one or more bearings such as roller bearings embedded in bearing races, as will be understood readily by those of skill in the mechanical arts in view of this disclosure. In another example, a low-friction surface, such as a low-friction pad, can be used to facilitate the translational motion. An example low-friction pad is described hereinafter in connection with FIG. 4.

Figure 5:
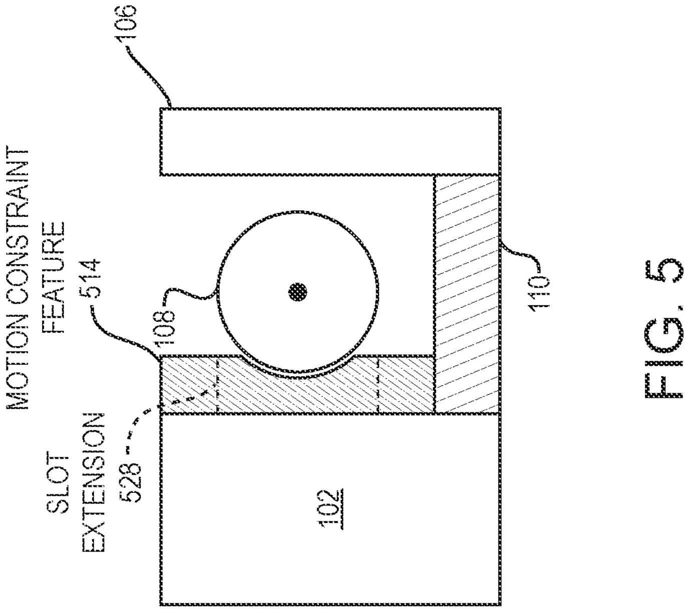
FIG. 5 is a schematic block diagram illustrating an alternative embodiment pipe inspection system including a motion constraint feature attached to the portable x-ray scanner.
Figures 6, 7:
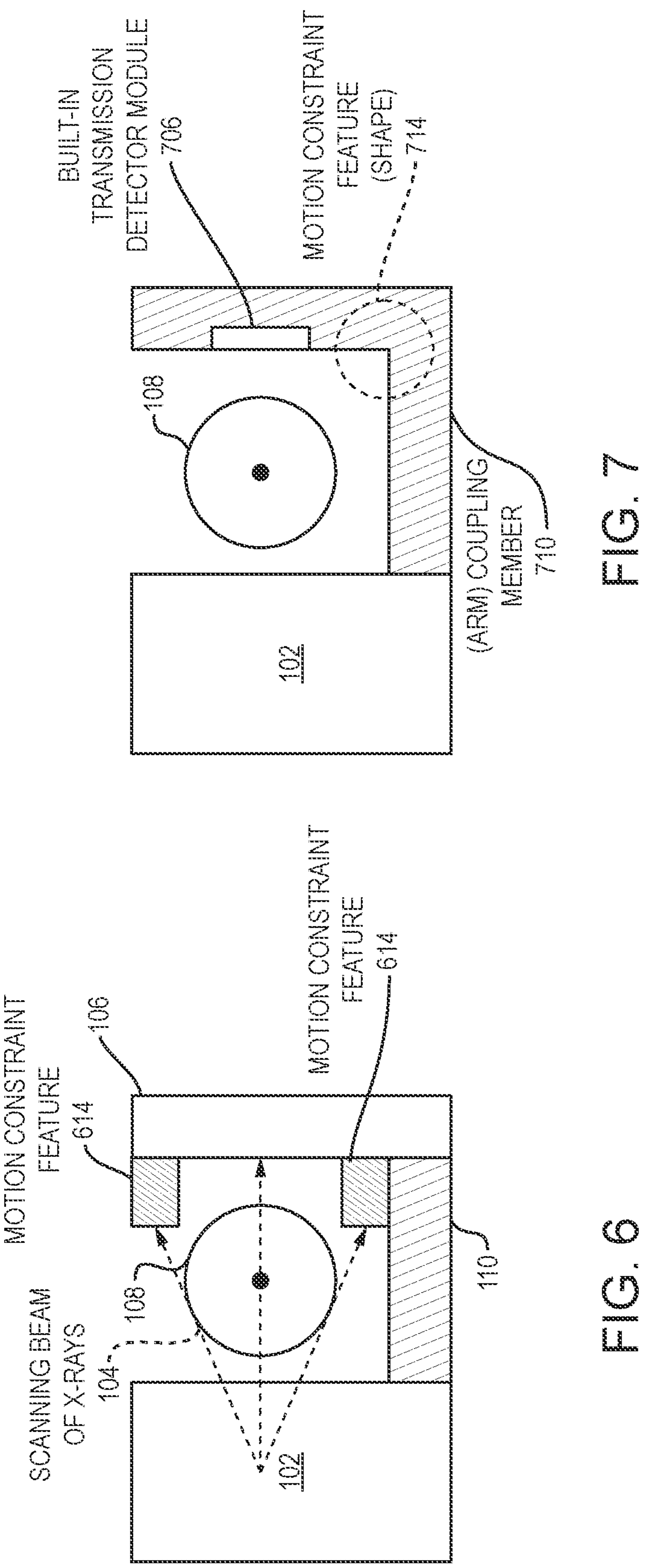
FIG. 6 is a schematic block diagram illustrating portions of an embodiment pipe inspection system having motion constraint features that are blocks attached to a transmission detector module.
FIG. 7 is a schematic block diagram illustrating portions of an embodiment pipe inspection assembly pipe inspection apparatus in which a transmission detector module is built into an arm-type coupling member that employs its shape as a motion constraint feature.
Figures 10, 11:
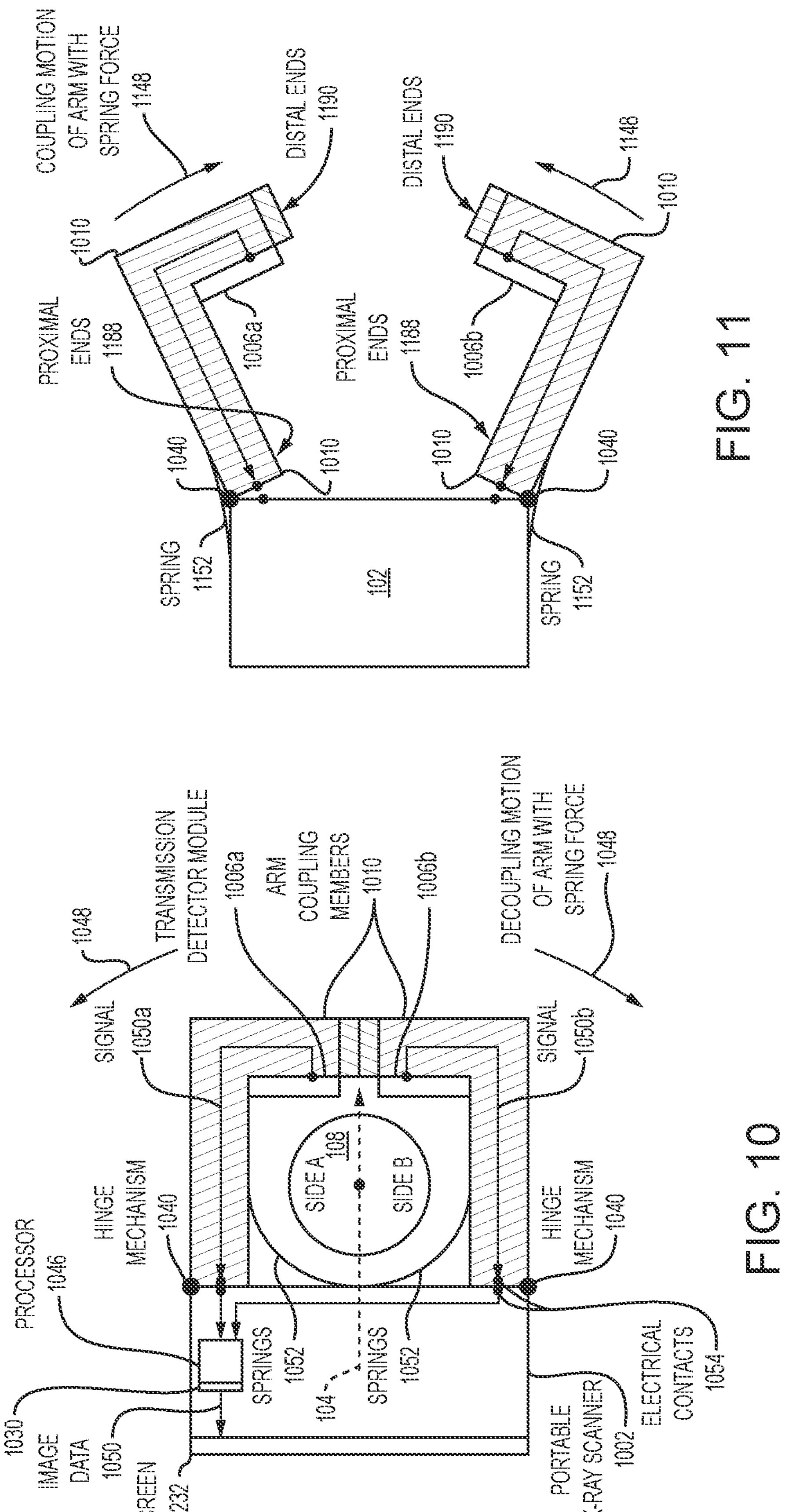
FIG. 10 is a schematic block diagram illustrating portions of an embodiment pipe inspection apparatus having two arm-type coupling members that are spring-loaded to remain open, in a disengaged arrangement with respect to the pipe, absent application of external force to close and engage the arms.
FIG. 11 is a schematic block diagram illustrating portions of an embodiment pipe inspection system having two arm-type coupling members in a state that is disengaged from the pipe.
Figures 12A, 12B, 13:
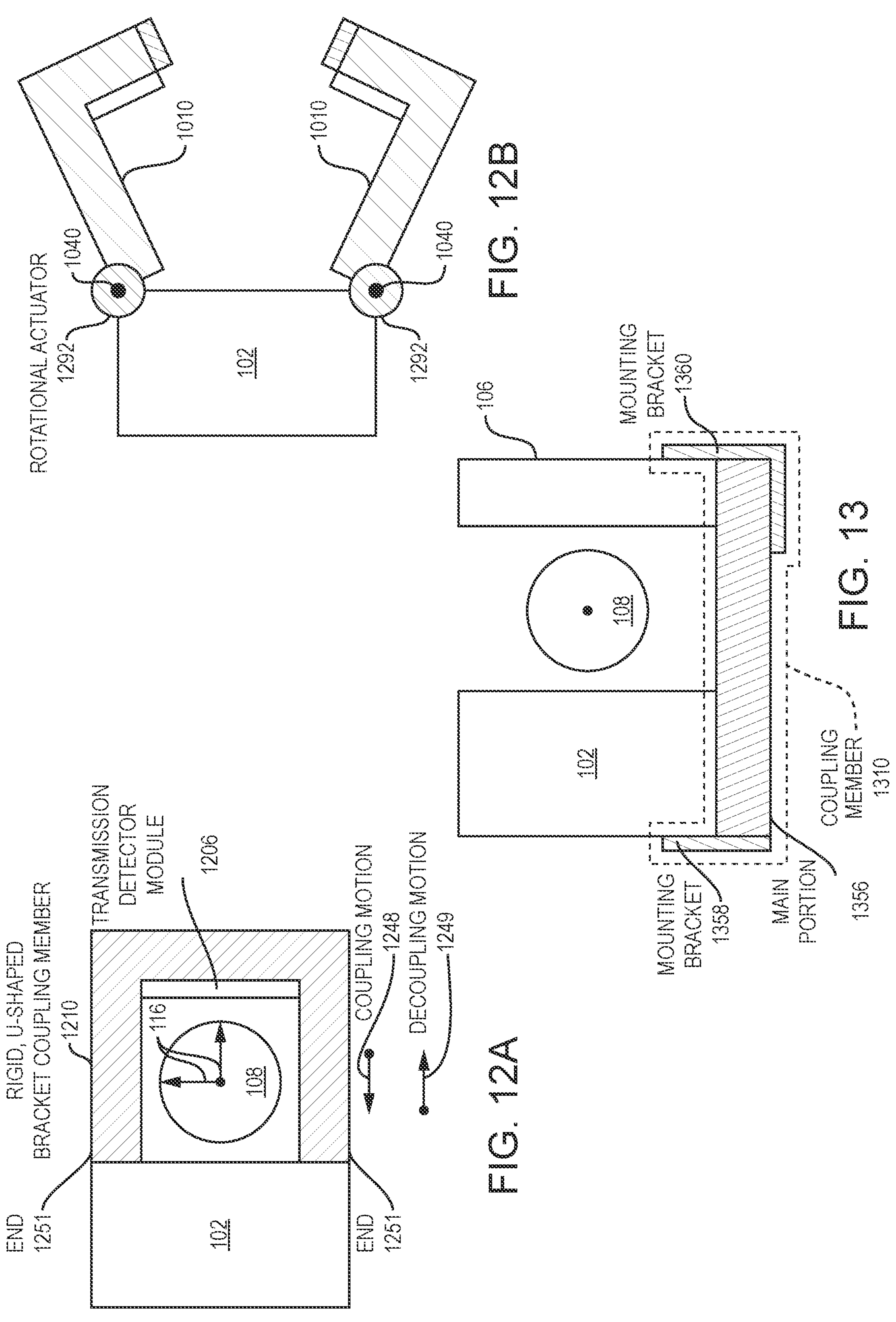
FIG. 12A is a schematic block diagram illustrating portions of an embodiment pipe inspection system having a rigid, U-shaped bracket-type coupling member.
FIG. 12B is a schematic block diagram illustrating portions of an embodiment pipe inspection system having rotationally motorized motion of a two-arm-type coupling member.
FIG. 13 is a schematic block diagram illustrating portions of an embodiment pipe inspection system including mounting brackets by which the coupling member couples the portable x-ray scanner to the transmission detector module.

In some embodiments, the motion constraint feature 114, which is shown in FIG. 1A schematically only, is defined by a shape of the coupling member 110. One example includes that described hereinafter in connection with FIG. 7, in which a shape of an arm-type coupling member, which includes a corner, can be used to guide a pipe inspection assembly along an axial direction of the pipe. In another example, in FIG. 4, a motion constraint feature is built on to a portion of the coupling member. In FIG. 5, the motion constraint feature is built onto the portable x-ray scanner. In FIG. 6, the motion constraint feature is built onto the transmission detector module. In FIGS. 10-12, showing various embodiments, the motion constraint feature is provided by, formed by, or defined by the shapes of the various coupling members, which include dual arm-type coupling members in FIGS. 10-11 and a rigid, U-shaped bracket coupling member in FIG. 12A.

In addition, in FIGS. 14A-14D and 15A-15B, the motion constraint features are provided, defined by the shapes of the strap-arm-type coupling members when the various pipe inspection systems illustrated in those drawings are engaged with the illustrated pipe. In addition, the rollers illustrated in FIGS. 14A-14D assist in constraining motion in the axial direction in the radial direction. For example, in the embodiment of FIG. 14A, as the strap arm coupling member is latched into place with a latch mechanism having corresponding latch mechanism features on the strap arm coupling member and the portable x-ray scanner, the strap arm coupling member becomes engaged with the pipe, meaning that it is in position for x-ray scanning operation, and motion of the portable x-ray scanner and strap arm coupling member are limited in the radial direction of the pipe, including during translational motion along the axial direction of the pipe.

In the embodiments illustrated in FIGS. 14A-14D and 15A-15B, for example, the strap arm coupling members incorporate a transmission detector module, as described in greater detail hereinafter. In this manner, both features of the strap arm coupling members and of the incorporated transmission detector modules define, by their shapes, motion constraint features of those embodiments. It will be understood by the examples provided hereinafter, thus, that embodiments can include motion constraints features that are defined by a shape of the coupling member, defined by a shape of the portable x-ray scanner, or defined by a shape of the transmission detector module.

It should be understood by the various embodiments that in a multitude of different ways, the motion constraint feature may be built onto or formed by a portion of the portable x-ray scanner, a portion of the coupling member, a portion of the transmission detector module, or a combination thereof. In some embodiments, such as those illustrated in FIGS. 4-7, motion constraint in a radial direction is provided for some radial directions, while motion in other radial directions is not constrained. In these embodiments, the motion constraint that is provided by the features and several embodiments are sufficient to enable an operator to translate the pipe inspection assembly reliably along the axial direction of the pipe, such as by sliding along a surface of a provided motion constraint feature, for example.

In some embodiments, the coupling member 110 includes one or more arms, that are configured to be coupled to the portable x-ray scanner 102 and to the transmission detector module 106, and the coupling member is further configured to extend at least partially around the pipe. Various embodiments including arm-type coupling members include those illustrated in FIGS. 7, 10-11, 14A-14D, and 15A-15B. The arm or arms may be rigid, such as the rigid arms illustrated in FIGS. 7, 10, and 11, or the one or more arms may be flexible, such as in a form of a flexible strap. Examples of flexible strap arm-type coupling members are described in connection with FIGS. 14A-14D and 15A-15B, for example.

A transmission detector module within the scope of embodiments can include a scintillator material configured to be mechanically coupled to the one or more arms. Examples include the scintillator screens illustrated in FIGS. 16A-16B, which are part of transmission detector modules shown in those figures that are mechanically coupled to, and form part of, the arm-type coupling members illustrated in FIGS. 14A-14D and 15A-15B.

Figures 15A, 15B:
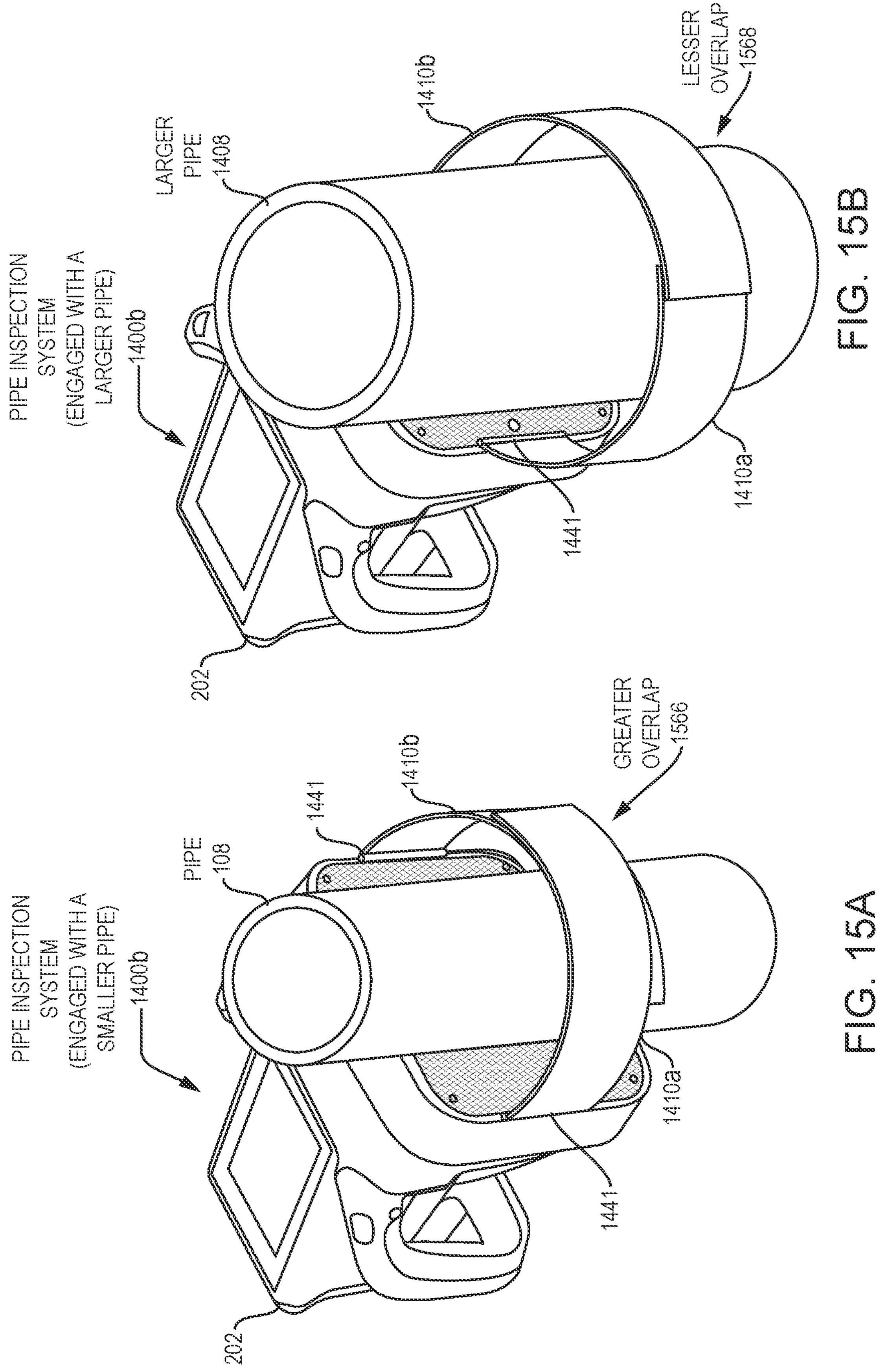
FIG. 15A is a perspective-view illustration of the pipe inspection system of FIG. 14B, with the two-strap-arm-type coupling members engaged with a smaller pipe.
FIG. 15B is a perspective-view illustration of the pipe inspection system of FIGS. 14B and 15A, with the two-strap arm-type coupling members engaged with a pipe of larger diameter.
Figures 16A, 16B:
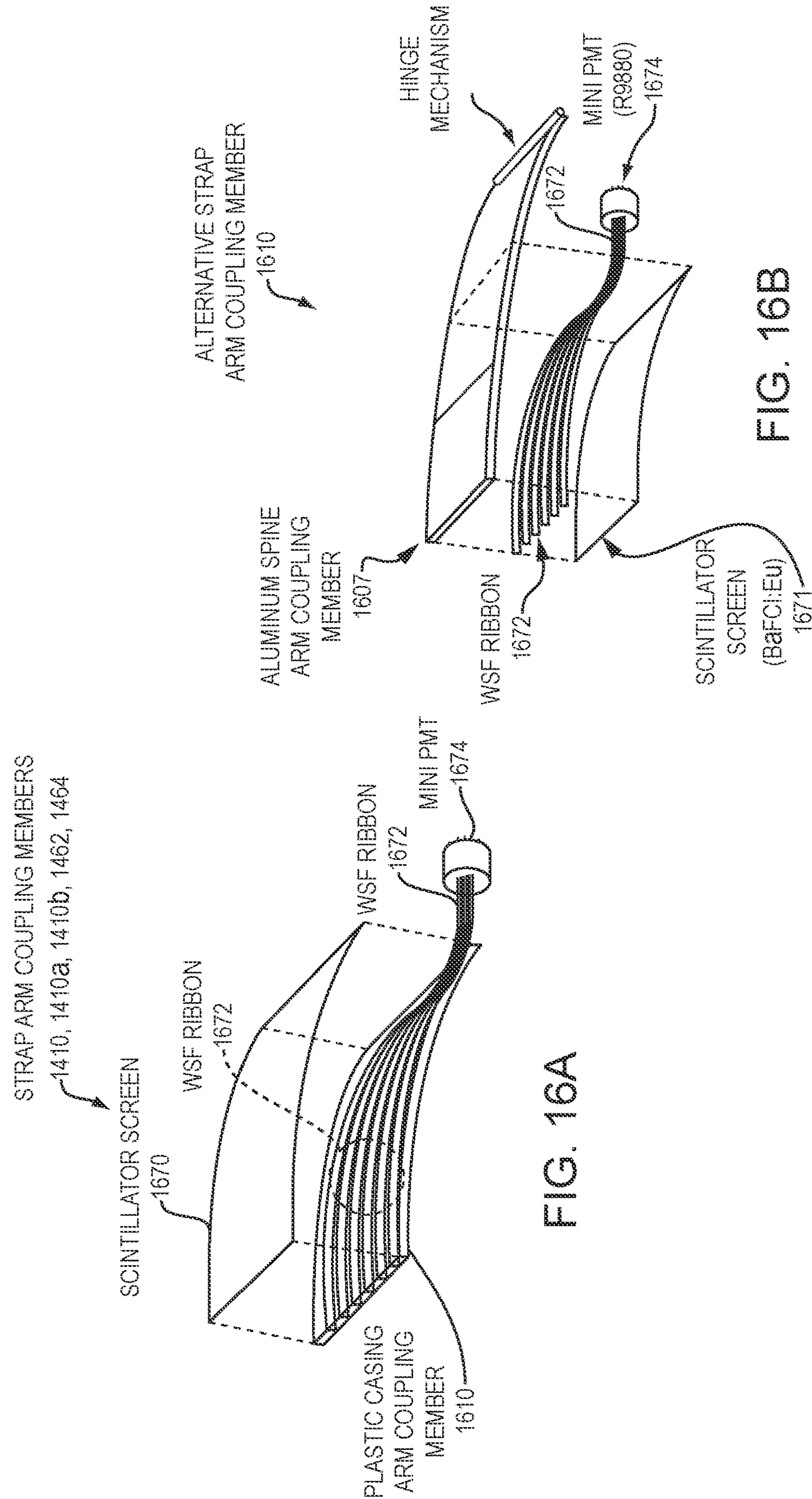
FIG. 16A is a perspective-view illustration of a strap-arm-type coupling member having a plastic casing and encompassing a ribbon of wavelength shifting fibers (WSFs) as part of an incorporated transmission detector module having a scintillator screen.
FIG. 16B is a perspective-view illustration of an alternative strap-arm-type coupling member that may be used in embodiments, having an aluminum spine arm coupling member and an attached WSF ribbon-based transmission detector module.

In some embodiments, the scintillator material is a strip of scintillator phosphor screen, such as illustrated in FIGS. 16A-16B. The transmission detector module may include one or more ribbons of wavelength-shifting fibers (WSFs) optically coupled to the strip of scintillator phosphor screen, such as illustrated particularly in FIGS. 16A-16B and as incorporated into the strap-arm-type embodiments of FIGS. 14A-14D and 15A-15B. The transmission detector module may further include a photodetector, with at least one end of a ribbon of the one or more ribbons of WSFs being optically coupled to the photodetector, as illustrated in FIGS. 16A-16B. Furthermore, as illustrated in FIGS. 16A-16B, the photodetector can be a photomultiplier tube (PMT).

In various embodiments, the transmission detector module can be incorporated at the arm of an arm-type coupling member, whether the arm-type coupling member is rigid, flexible, one of two arms, etc. As used herein, "Incorporated at" includes attached to, coupled to, or embedded into the arm. In one example, a transmission detector module is built into the arm-type coupling member illustrated in FIG. 7. In another example, in FIG. 10 and FIG. 11, transmission detector modules are built onto, or attached to, or coupled to the arm-type coupling members.

Furthermore, in the embodiments of FIGS. 14A-14D and 15A-15B, the transmission detector modules may be considered to be attached to, coupled to, or embedded into, the arms, because, as illustrated in FIG. 16A, detector module components including the scintillator screen and wavelength shifting fiber are built together with a plastic casing arm-type coupling member. Furthermore, in the example of FIG. 16B, for example, and aluminum spine-type arm coupling member has, built onto it or coupled mechanically to it, a WSF ribbon and a scintillator screen that together form a transmission detector module with a PMT. These strap arm coupling members that incorporate the transmission detector modules are used in the example embodiments already noted.

Figures 8, 9:
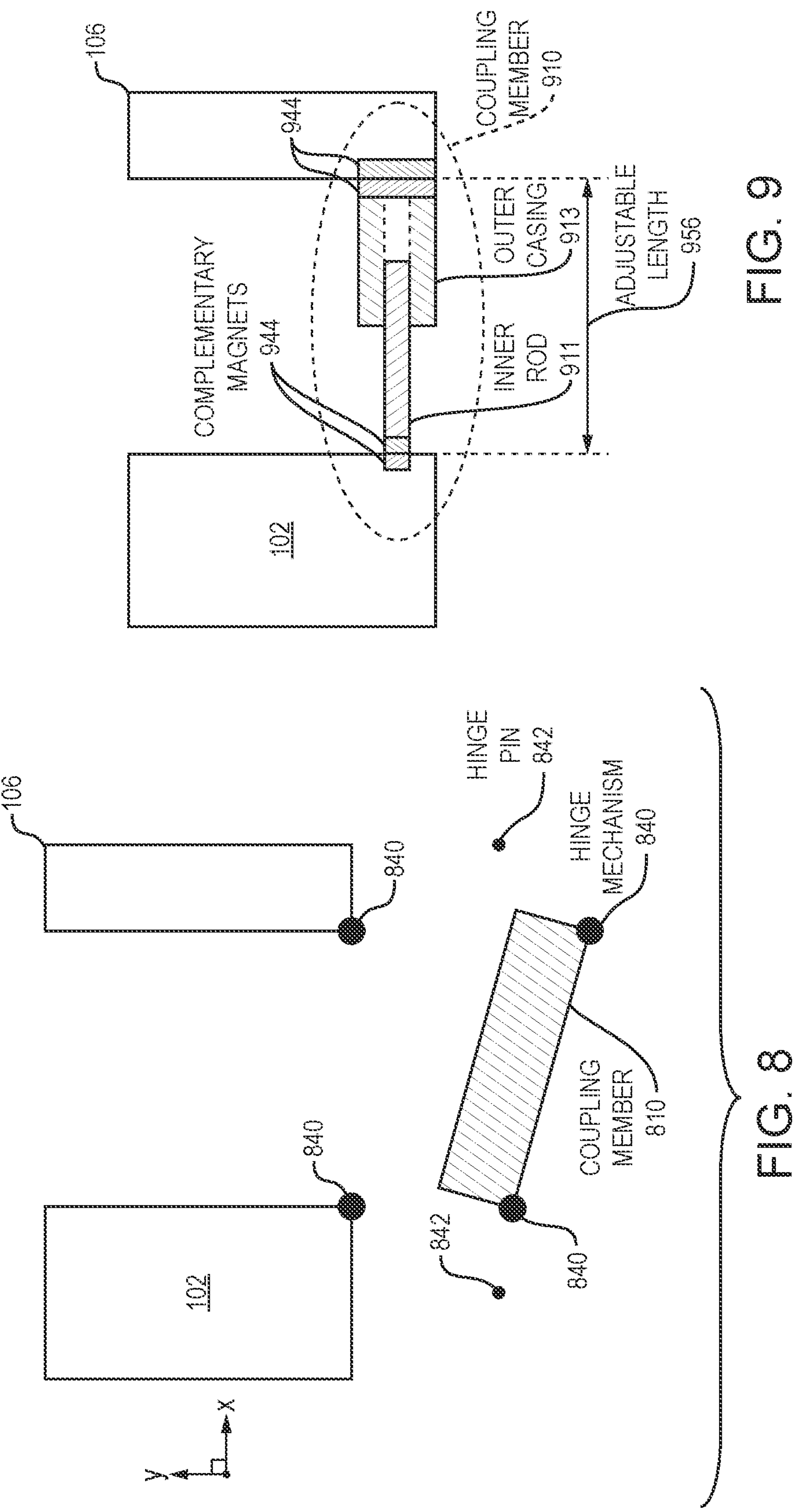
FIG. 8 is a schematic block diagram illustrating portions of an embodiment pipe inspection system having a coupling member that can be rotationally coupled to a portable x-ray scanner and to a transmission detector module via a hinge mechanism.
FIG. 9 is a schematic block diagram illustrating portions of an embodiment pipe inspection system having an extendable coupling member with adjustable length.

The coupling member 110 may further include a hinge mechanism that is configured to couple the arm to the portable x-ray scanner 102. Examples of arms coupled by, or configured to be coupled by, hinge mechanisms to the portable x-ray scanner, are shown in FIGS. 8, 10, 11, 14A-14C, and 15A-15B, for example. These hinge mechanisms may provide for complete decoupling between the coupling member and the x-ray scanner or between the coupling member and the transmission detector module, or between both, as illustrated in FIG. 8, for example. Alternatively, the hinge mechanisms may only provide for rotational coupling, in which the components typically remain at least passively coupled, such as illustrated in FIGS. 10 and 11, for example. Decoupling between the portable x-ray scanner and the arm-type coupling member can be provided by a quick-release mechanism, such as illustrated in FIG. 14D. In some embodiments, the quick-release mechanism that allows mechanical decoupling upon application of an external force, such as by a human pulling the coupling member from the x-ray scanner, can be provided by a magnetic linkage that is included in the hinge mechanism. One example magnetic linkage is illustrated in FIG. 9, although without a rotational coupling. However, in FIG. 14D, a quick-release mechanism that provides rotational coupling between the strap arm type coupling member and the portable x-ray scanner can be a magnetic linkage, as will be readily understood, or other types of quick release mechanisms.

In some embodiments, the arm coupling member can be spring-loaded such that it remains disengaged from the pipe in the absence of an external force. An example is provided in FIG. 10, wherein springs tend to keep the two arm-type coupling members open and disengaged unless a force is applied. On the other hand, spring loading, such as by a spring mechanism, may be provided to cause the arm or arms to remain engaged with the pipe absent application of external force, such as in the example of FIG. 11.

In some embodiments, an arm-type coupling member may be a first arm that is configured to attach to the portable x-ray scanner at a proximal end of the first arm. The coupling member may also include a second arm that is configured to attach to the portable x-ray scanner at a proximal end of the second arm and to extend at least partially around the pipe. Examples of embodiments so configured include FIGS. 10-11, and more particularly, FIG. 11, in which such features are labeled the distal ends and proximal ends.

The single arm-type coupling member illustrated in FIG. 7 extends partially around the pipe, and so does each of the two arm coupling members illustrated in FIGS. 10-11, 14B, 15A, and 15B. Furthermore, the first and second arms, whether straps or rigid portions of a two-part arm coupling member, may be configured to be mechanically coupled to each other via respective distal ends of the first and second arms, such as the distal ends illustrated in FIG. 11. Furthermore, it will be understood that, similarly, the two strap arm coupling members illustrated in FIGS. 14B, 15A, and 15B all have proximal ends that are configured to attach to the respective x-ray scanners, and distal ends that are configured to be coupled to each other. The coupling may be provided by passive means, such as the springs illustrated in FIG. 11 that tend to hold distal ends of the two arms forming the coupling member together absent external force. Alternatively, the coupling of distal ends of the first and second arms forming the coupling member may be held together by active means, such as a mechanical latch, a pair of magnets, a magnet and a magnetically susceptible material, or other mechanical coupling means that are known in the art, including snaps, rivets, means for tying or looping a string to maintain the ends together, etc.

A combination of the first and second arms may be configured to extend fully around the pipe, when taken together, in order to couple the pipe inspection assembly to the pipe, or in other words to engage the arms with the pipe. However, in some embodiments, either one arm, or even a combination of first and second arms of a coupling member, may not extend fully around the pipe in a coupling configuration, and such a configuration can still adequately provide scanning and imaging functionality. In one example, the arm coupling member of FIG. 7 does not extend fully around the pipe, nor does the built-in transmission detector module that is built into the arm coupling member. Yet such embodiments can still provide the needed transmission imaging capability provided that a transmission detector module or modules can adequately capture a scan across the diameter of the pipe, as will be understood by those of skill in the art of x-ray imaging.

In some embodiments, the transmission detector module includes two transmission detector portions coupled to the first and second arms, respectively. The first and second transmission detector portions are configured to detect x-rays transmitted through first and second sides of the pipe, respectively. This configuration applies to the embodiments of FIGS. 10-11, 14B, and 15A-15B, by way of example.

Some embodiments that include arm-type coupling members, namely one or more of such arms forming an overall coupling member, may be configured to move the arm or arms into an engaged position with respect to the pipe or into a disengaged position with respect to the pipe via an actuator, such as an electric actuator, a pneumatic actuator, etc. An example of a rotational actuator provided for this purpose is illustrated in FIG. 12B. Moreover, in view of the drawings and disclosure herein, it will be readily recognized by those of skill in the art that a translational actuator may be provided for modification of the embodiment of FIG. 9, for example, in order to adjust the length shown and thus engage or disengage the illustrated embodiment with a pipe. As used herein, "engaged" means that the motion constraint feature is constraining the radial motion of the pipe inspection assembly and that the arm or arms are otherwise positioned with respect to the pipe for scanning and pipe inspection operation as intended. Further as used herein, "disengaged" means that the motion constraint feature is not in a position to constrain the radial motion of the pipe inspection assembly and that the arm is otherwise not positioned with respect to the pipe for pipe inspection operation.

As indicated above, the embodiment of FIG. 9 is an example in which an arm-type coupling member has an adjustable length, and it will also be recognized that the strap-arm-type coupling member of FIG. 14C, with the extension described hereinafter, also has an adjustable length in order to accommodate different pipe diameters.

A significant advantage of embodiments described herein is that, when performing transmission imaging with a scanning beam, the transmission detector module need not include a pixilated detector. In other words, the transmission detector module may include a non-pixelated detector, which is much less expensive, much less complex, and is much more lenient in terms of alignment tolerance with the beam. The non-pixelated detector can be used to detect x-rays of the scanning beam of x-rays 104 that are transmitted through the pipe 108 over a scan, such as an entire scan, of the scanning beam. Nonetheless, pixelated detectors may be used and are within the scope of embodiments.

Figure 17:
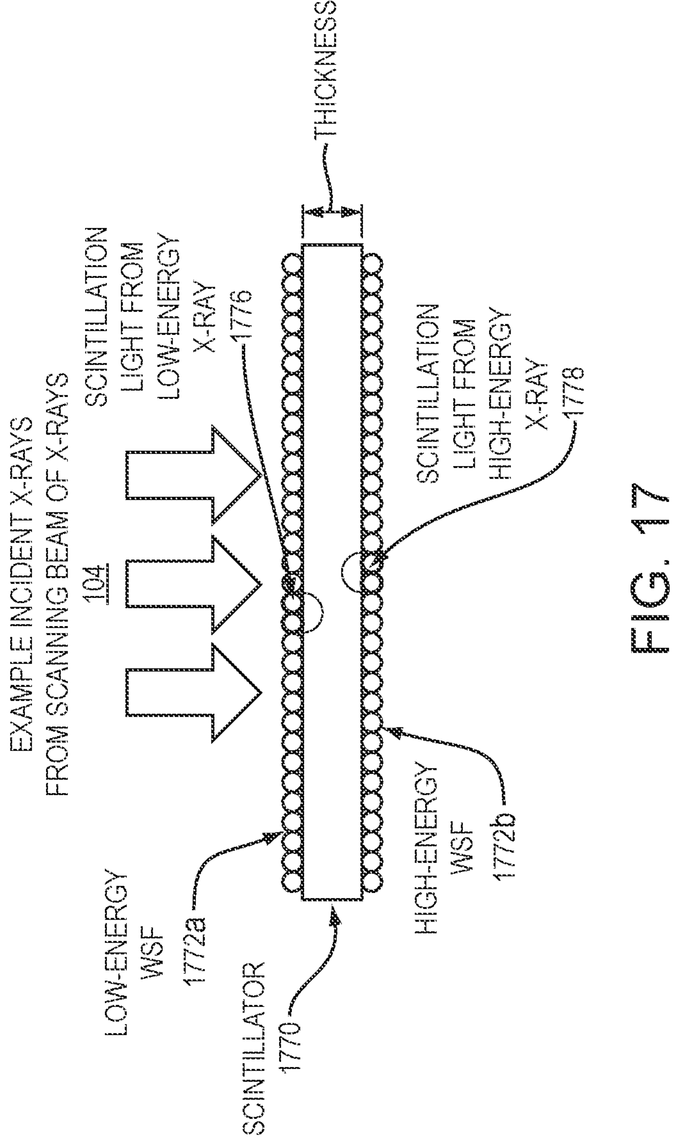
FIG. 17 is a cross-sectional, schematic diagram illustrating a dual-energy transmission detector module structure that can be used to obtain energy spectral information about x-rays that are transmitted through a pipe using embodiment systems and methods.

In some embodiments, the transmission detector module provides information about a spectral content, namely an energy content, of the x-rays transmitted through the pipe. FIG. 17 illustrates an example of one example transmission detector structure that can be used in transmission detector modules according to embodiments in order to provide information about spectral content of the transmitted x-rays.

In some embodiments, the portable x-ray scanner can include one or more backscatter detectors that are configured to detect x-rays of the scanning beam that are backscattered by the pipe. The portable x-ray scanner that is handheld and illustrated in FIGS. 2, 14A-14D, and 15A-15B, for example, is a handheld backscatter imager. It should be understood that transmission x-ray scanning is one function of this portable imager and is the only function needed in certain embodiments that perform only transmission imaging, for example. Nonetheless, as is understood in the art, and as will be understood in view of the particular embodiments with particular configurations and purposes described herein, an embodiment can be configured to perform both transmission imaging and backscatter imaging simultaneously, for example, based on a single x-ray scanning beam 104.

In some embodiments, the coupling member is a rigid, U-shaped assembly having two ends that are configured to fit over a pipe and to be coupled to the portable x-ray scanner in a coupled configuration and to be completely detached from the pipe in a decoupled configuration, such as illustrated in the embodiment of FIG. 12A. In such case, the transmission detector module may be built into, or onto, an interior side of the U-shaped coupling member, as is illustrated in FIG. 12A, for example.

Figure 4:
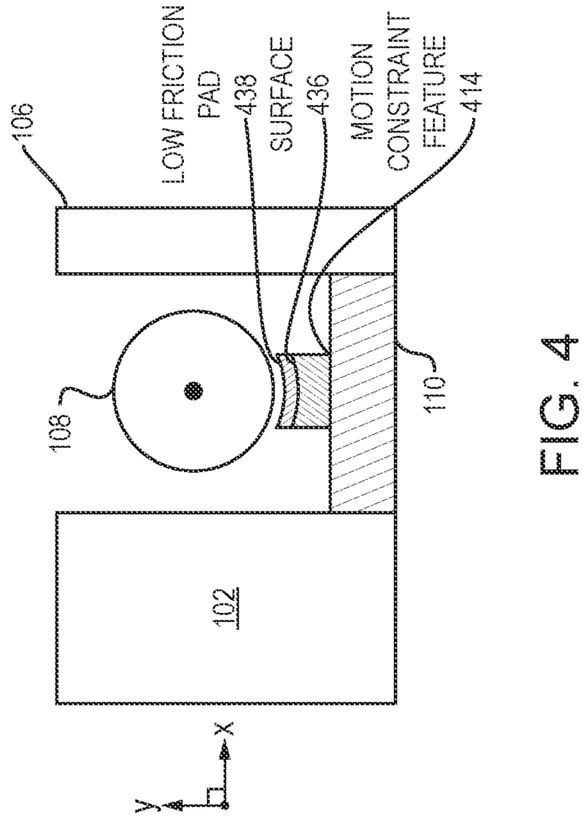
FIG. 4 is a schematic block diagram illustrating an embodiment pipe inspection system having a motion constraint feature connected to a coupling member, as well as a low-friction pad that facilitates translational motion of a pipe inspection assembly along the pipe axial direction.

More generally, in any of the embodiments, the coupling member can be configured to be detachable from the portable x-ray scanner, from the transmission detector, or from both, as illustrated in FIG. 8, for example, where hinged coupling mechanisms with hinge pins provide a manner for the complete detachment. Nonetheless, in other embodiments, the coupling provided by the coupling member, between the portable x-ray scanner 102 and the transmission detector module 106, may be permanent or semi-permanent, and not intended for quick release. In the embodiment of FIG. 4, for example, if the coupling is permanent, the pipe inspection assembly 112 including the portable x-ray scanner 102, coupling member 110, and transmission detector module 106 may be manually slid over the pipe 108 and then lifted or translated from the pipe 108, through the free space on one side of the pipe inspection assembly 112, for example. In some embodiments, a mounting bracket may be included in the system. In particular, the coupling member can include a mounting bracket that is configured for coupling the transmission detector module to the portable x-ray scanner, as illustrated in example FIG. 13. The mounting bracket can generally be detachable from the portable x-ray scanner, from the transmission detector module, or from both, as provided for in the embodiment of FIG. 13.

Figure 19:
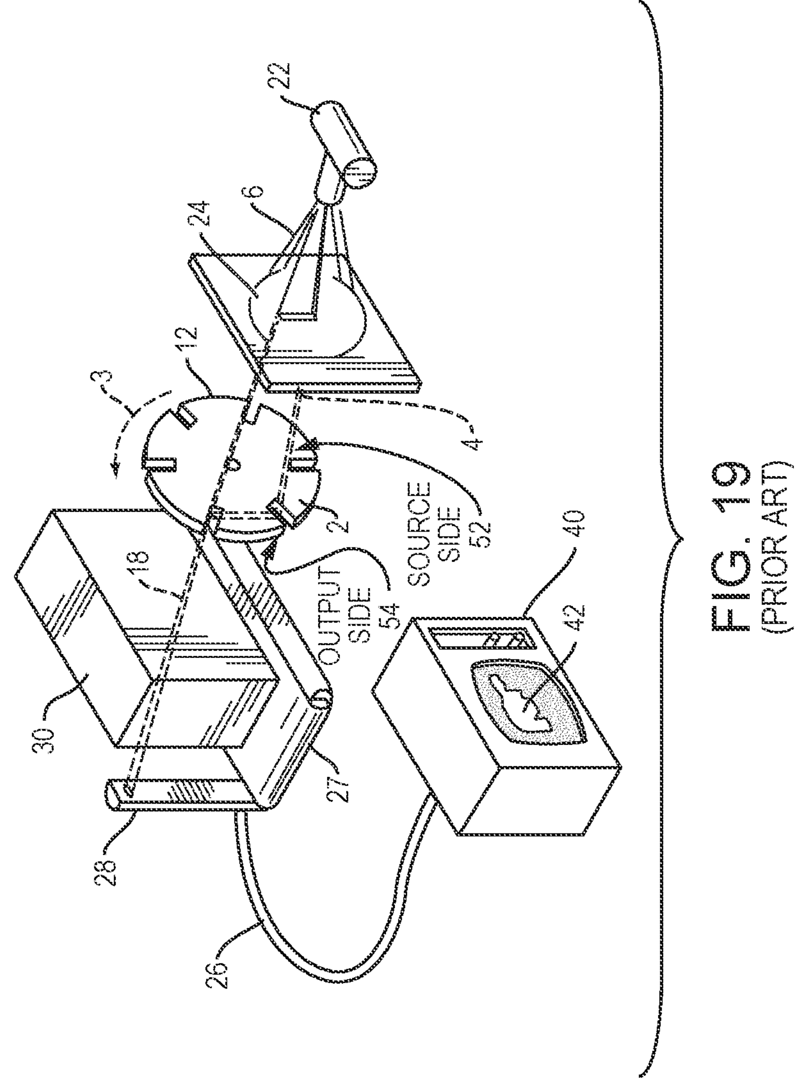
FIG. 19 (prior art) is a perspective-view schematic diagram illustrating an existing x-ray detection system using a scanning pencil beam arrangement.

In some embodiments, the transmission detector module 106 may provide an output signal, such as a raw output signal, but the embodiment does not need to produce an actual image of the pipe, and such imaging can be performed by a separate system or apparatus, such as illustrated in FIG. 19. Nonetheless, in some embodiments, such as those that use the portable x-ray scanner illustrated in FIG. 2, a backscatter image of the type may be provided directly on a screen that is provided in the portable x-ray scanner (backscatter imaging system including the portable x-ray scanner). As will be understood by those of skill in the art, the backscatter imaging apparatus of FIG. 2 includes, internally, an output interface that is configured to output image data for providing an image of a target object. When applied to a pipe, the backscatter imaging system of FIG. 2 provides a backscatter image of the pipe at a screen on the apparatus.

Moreover, it will be readily understood in view of the embodiments described herein that the x-ray backscatter imaging apparatus of FIG. 2, when used in connection with embodiments as illustrated in FIGS. 14A-14D and 15A-15B, for example, a signal from the transmission detector module may be analyzed and processed and used to provide a transmission x-ray image of the pipe as well, including at the screen shown in FIG. 2. FIG. 10, for example, illustrates how signals from a transmission detector module may be output to a portable x-ray scanner that includes an appropriate processor and output interface to provide output image data for providing an image of the pipe under inspection to a screen, for example. The x-ray transmission image may be an image of the interior of the pipe, and/or an exterior of the pipe that is obscured under insulation, etc.

FIG. 1B is a schematic block diagram illustrating the pipe inspection system 100 of FIG. 1A in the XY plane, a cross-sectional plane of the pipe 108. In FIG. 1B, certain features are more readily discernible than in FIG. 1A, such as that the scanning beam of x-rays 104 scans with a scan direction 122. Such scanning may also be referred to herein as beam "sweeping" or "beam sweep," for example. Further illustrated in FIG. 1B is our additional example radial directions 116. As described herein above, the motion constraint feature 114, which is only shown schematically in FIGS. 1A-1B for purposes of understanding a variety of embodiments, need only constrain radial motion in one or several example radial directions 116. In order to facilitate, or at least permit the translational motion 118 in the axial direction 120, it is desirable for motion constraint in the radial directions to be partial. Such partial motion constraint further enables ease of use of a pipe inspection system as it is translated along the axial direction 120 of the pipe.

FIG. 2 (prior art) is a perspective-view diagram of an existing handheld backscatter imaging apparatus. In the context of embodiments described herein, this existing apparatus is referred to herein as a "portable x-ray scanner 202." It should be understood that the portable x-ray scanner 202 includes a backscatter imaging function that is not required in all embodiments. Nonetheless, the portable x-ray scanner 202 provides the needed x-ray scanning function, namely outputting a scanning beam of x-rays, that is useful in embodiments, and the extra backscatter imaging functionality of the portable x-ray scanner 202 can also be useful in that type of scanning context.

The portable x-ray scanner 202 includes handles 224 to permit the unit to be used in a handheld fashion, namely held in hands of an operator, with the human operator supporting the entire weight of the portable x-ray scanner 202. The portable x-ray scanner tool includes the backscatter detector 226, which is split into two parts, that is configured to detect x-rays of the scanning beam that are back scattered by a target object that is irradiated by the scanning x-ray beam, including x-rays backscattered from the pipe 108 as illustrated in FIG. 1A. A slot 228 provides an opening for the scanning x-ray beam to exit, and the beam is scanned as illustrated in FIG. 1B with a periodic sweeping direction for scanning over a target object such as a pipe 108. X-rays that are scattered by the pipe can be detected by the backscatter detector 226, and a signal produced internally by the detector 226 can be used within the units to create a backscatter image of the pipe at the screen 232. Advantageously, when applied to pipe inspection systems described herein, the units can be adapted to display not only the backscatter image, but also the x-ray transmission image that is produced simultaneously by using the transmission detector module 106 illustrated in FIGS. 1A-1B. Raw signals from the transmission detector module 106 can be received at the portable x-ray scanner 202 in a manner indicated in the example shown in FIG. 10, described hereinafter.

FIG. 3 is a schematic block diagram illustrating an embodiment pipe inspection system 300 that is not handheld. Instead, the portable x-ray scanner 102, and consequently the pipe inspection assembly 112, when coupled with the transmission detector module 106, is carried by a robotic platform 334 to perform the translational motion 118 in the axial direction 120 of the pipe. As will be easily envisioned by those of skill in the art of robotics in view of the disclosure herein, alternative robotic platforms may be used in cases of translational motion 118 along the ground, such as applied to a pipe 108 that is horizontal with respect to the ground, or a robotic platform 334 that has separate means for attaching to a vertical pipe 108 that extends vertically from the ground. Thus, it will be appreciated that embodiments within the scope envisioned by FIGS. 1A-1B include a wide variety of handheld and robotic-based systems and methods.

As clarified hereinabove, the pipe inspection system 300 does not include the pipe 108, but rather is applied to the inspection of the pipe 108. Instead, the pipe inspection system 300 includes the pipe inspection assembly 112, the motion constraint feature 114, and the robotic platform 334.

FIG. 4 is a schematic block diagram illustrating portions of an example embodiment pipe inspection system. In particular, the system of FIG. 4 includes a motion constraint feature 414 with a semi-cylindrical surface 436 in order to conform generally to a shape of the cylindrical pipe 108 in order to constrain motion with respect to the pipe 108. Thus, in this case, the motion constraint feature 414 is separate from the coupling member 110 but is built on to the coupling member 110. In addition, a low friction pad 438, as an example of a low friction surface in general, is applied to the surface 436 in order to facilitate translational motion 118 in the axial direction 120, which is into the page in the example of FIG. 4.

FIG. 5 is a schematic block diagram illustrating portions of an embodiment pipe inspection system in which a motion constraint feature 514, which is separate from the coupling member 110, is attached to the portable x-ray scanner 102. A slot for output of the scanning beam of x-rays (not illustrated in FIG. 5), similar to the slot 228 illustrated in FIG. 2, may be extended through the motion constraint feature 514, as illustrated with the extension 528. In this manner, the scanning beam of x-rays output from the portable x-ray scanner 102 is not impeded from intersecting with the pipe 108.

FIG. 6 is a schematic block diagram illustrating portions of an embodiment pipe inspection system, in which the system includes motion constraint features 614, in the form of blocks, in order to constrain radial motion of the inspection assembly with respect to the pipe 108. The motion constraint features 614, in this case, are built on to the transmission detector module 106. In this case, it is preferable for the blocks 614 to be far enough apart such that the transmission detector module 106 can detect a full sweep of the x-rays of the scanning beam 104, unimpeded by the motion constraint feature 614. However, detection of the entire sweep is not required in some embodiments, and an image of the pipe based on transmitted x-rays can still be provided with detection of only a portion of the sweep, as shown in FIG. 6.

FIG. 7 is a schematic block diagram illustrating portions of an embodiment pipe inspection system in which a transmission detector module 706 is built into an arm-shaped coupling member 710. In this manner, the arm coupling member 710 is configured to couple the portable x-ray scanner 102 to the transmission detector module 706. In addition, FIG. 7 illustrates that a motion constraint feature 714 may be provided via a shape of the arm-type coupling member 710, in this case a right-angle shape. Thus, as will be understood from these example embodiments, in other embodiments the motion constraint feature may be provided by the coupling member itself and need not be provided as a separate element like the feature 414 or the feature 514 in FIGS. 4-5, respectively.

It will also be noted that, in reference to FIG. 7, that the arm coupling member 710 is configured to extend at least partially around the pipe 108, namely around a circumference of the pipe 108. In this manner, a transmission detector module such as the built-in transmission detector module 706 may detect most x-rays transmitted through the pipe 108 across a sweep of the scanning beam of x-rays 104. Furthermore, a transmission detector module, whether attached to the arm coupling member 710 or built thereon, can be designed to be wide enough or long enough to capture an entire sweep of the scanning beam. Moreover, in other embodiments, two arm-type coupling members, or to arms forming a coupling member, may, together, extend entirely around the pipe from the portable x-ray scanner 102, such that the engaged unit as a whole, engaged with the pipe 108, encompasses an entire circumference of the pipe 108. In reference to other embodiments described hereafter, it will be appreciated that arm-type coupling members can be rigid or flexible, such as being in the form of a flexible strap, as illustrated and described hereinafter in connection with FIGS. 14A-14B and 15A-15D, for example.

FIG. 8 is a schematic block diagram illustrating portions of an embodiment pipe inspection system in which a coupling member 810 is rotationally (hingedly) configured to be coupled or decoupled from the portable x-ray scanner 102 and the transmission detector module 106. The coupling member 810 includes hinge mechanisms 840 at two corners thereof, and corresponding hinged mechanisms 840 are found on the scanner 102 and module 106. Hinge pins 842 are inserted through corresponding hinge mechanisms 840 in order to couple the coupling member 810, or rather to use the coupling member 810 to couple the scanner 102 and module 106. In turn, the hinge pins 842 may be removed in order to decouple the scanner 102 and module 106. In this manner, the coupling member 810 is completely detachable from the portable x-ray scanner 102 and from the transmission detector 106. In other embodiments, only one of the sides may be detachable. In yet other embodiments, the hinge mechanisms can use magnets, allowing the coupling member to be detached through the application of an external force. Yet other hinge mechanisms can contain snap connectors or spring-loaded connectors, allowing for easy detachment. Detachability is useful for storage of the unit and for ease of applying the unit to a pipe as needed. It will be noted that a motion constraint feature is not particularly illustrated in FIG. 8, as the scope of motion constraint features available in various embodiments is adequately illustrated and described in connection with other drawings.

FIG. 9 is a schematic block diagram illustrating portions of an embodiment pipe inspection system including a coupling member 910 that has an adjustable length 956 that is useful to accommodate pipes of different diameters. The coupling member 910 does this by including two parts, namely an inner rod 911 that is coupled to the scanner 102 and an outer casing 913 that is coupled to the transmission detector module 106. Alternatively, the inner rod may be coupled to the transmission detector module 106 and the outer casing may be attached to the scanner 102. In this manner, the inner rod 911 may slide into or out of the outer casing 913 in order to adjust the length 956 needed to accommodate pipes of different diameters.

Also illustrated in FIG. 9 are complementary magnets 944 provided at the scanner and inner rod 911 in order to couple the inner rod 911 to the scanner 102, and at the outer casing 903 and the detector module 106 in order to couple those two components together. Magnetic linkages are useful for rapid assembly and disassembly and application of pipe inspection systems to pipes along the various lengths of the pipe as needed. Moreover, magnetic linkages can be useful in the case of rotational couplings that are in the form of a quick release mechanism, or other quick release mechanisms. An example of the quick release mechanism that can utilize a magnetic linkage similar to that of FIG. 9 is provided in FIG. 14D.

FIG. 10 is a schematic block diagram illustrating portions of an embodiment pipe inspection system having two arm coupling members 1010 that are rotationally coupled to a portable x-ray scanner 1002 via hinge mechanisms 1040. Via the hinge mechanisms 1040, the arm coupling members 1010 are enabled to be coupled together in an engaged configuration shown in FIG. 10 for purposes of scanning, or decoupled from each other in a disengaged configuration illustrated in FIG. 11, in which the system is disengaged from the pipe.

FIG. 10 also illustrates how arm coupling members 1010 can be spring-loaded, using the example springs 1052 for illustration. The springs 1052 cause the arms 1010 to be spring-loaded such that they remain disengaged from the pipe absent an application of an external force, such as force provided by human hands pushing the arms together. Once together, a latch, (not illustrated in FIG. 10) may be used to maintain the arm coupling members 1010 coupled to each other in the pipe-engaged configuration of FIG. 10.

The system of FIG. 10 also shows decoupling motion of the arms 1048, which the spring force of the springs 1052 tends to produce. It is this spring-loaded force that can be overcome in order to engage the system with the pipe 108. Such a configuration can provide simple, quick application of a unit to of a pipe inspection system with a pipe. In other embodiments, the spring-loaded force can be overcome in order to disengage the system with the pipe 108. In yet further embodiments, the spring-loaded force can provide forces that keeps the system both engaged with the pipe and also provides forces that keeps the system disengaged with the pipe. Application of an external force can be applied to toggle the system from one configuration to the other.

FIG. 10 also illustrates how a transmission detector module can include to transmission detector portions 1006*a* and 1006*b* that are coupled to the first and second arm coupling members 1010, respectively. The first and second transmission detector module portions 1006*a* and 1006*b* are configured to detect x-rays transmitted through first and second sides of the pipe 108 as will be readily understood by reference to the drawing, respectively. Signals 1050*a* and 1050*b*, which are raw signals from the transmission detector module portions 1006*a* and 1006*b*, respectively, can be transmitted as shown through the respective arm coupling members, and through electrical contacts 1054 provided at the arm coupling members and the portable x-ray scanner 1002, to a processor 1046 in the portable x-ray scanner 1002 for further processing. The processor 1046 processes the signals and creates an image signal that can be sent through an output interface 1032 the screen 232, which is also illustrated in FIG. 2.

More particularly, image data 1050 is output from the output interface 1030 in order to form the image at the screen 232. It should also be understood that in other embodiments, an output interface can be external from the portable x-ray scanner, instead of internal, as illustrated. Thus, a different device separate from the portable x-ray scanner 1002 can be enabled to display images of the scanned pipe, particularly the transmission images produced by the embodiment of FIG. 10. Furthermore, if a backscatter detection feature is included in an embodiment, as illustrated in the existing apparatus of FIG. 2, then image data 1050 can include both transmission image data and backscatter image data acquired simultaneously during the same scan of the pipe 108.

FIG. 11 is a schematic block diagram illustrating portions of an embodiment pipe inspection system with arm coupling members 1010 like the arm coupling members in FIG. 10. However, in FIG. 11, the arms are illustrated in a disengaged configuration, in which distal ends 1190 of the arm coupling members 1010 are decoupled from each other, and the arm coupling members 1010 are not engaged with a pipe (not illustrated in FIG. 11).

Furthermore, the system portions illustrated in FIG. 11 includes springs 1152 that are configured to spring-load the arm coupling members 1010 two remain coupled to each other at the distal ends 1190, absent application of an external force, such as a human user pulling the arms apart. Thus, the spring force of the spring 1152 tends to bring the distal ends 1190 together, coupled with each other, with a coupling motion 1148 absent external force. This arrangement can be very useful for scanning a pipe with many of the described embodiments, since the arm coupling members can be opened or closed easily in order to engage or disengage from a pipe and scan different portions of a pipe as needed. As will be understood, the hinge mechanisms 1040 allow the first and second arms 1010 to be attached to the portable x-ray scanner 102 at proximal ends 1188 of the first and second arms. Furthermore, as described herein above, in the coupled, engaged configuration in which the distal ends 1190 are coupled to each other, the arms 1010 each extend partially around the pipe (not shown in FIG. 11), and, together with the scanner 102, the pipe inspection assembly resulting therefrom extends completely around a circumference of the pipe. As described hereinafter in connection with FIG. 12B, the arms may be provided with motorized actuation for opening and closing where needed, such as in the case of a robotic application as illustrated in FIG. 3.

FIG. 12A is a schematic block diagram illustrating portions of an embodiments pipe inspection system that includes a coupling member 1210 in the form of a rigid, U-shaped bracket coupling member. The coupling member 1210, together with the scanner 102, encompass an entire circumference of the pipe 108 in an engaged configuration shown in FIG. 12. However, the coupling member 1210 may be decoupled from the scanner 102 with a decoupling motion 1249, such that the coupling member 1210 can be completely detached from the scanner 102. A coupling motion 1248 can be used to reattach the coupling member 1210 to the scanner 102. Magnetic, quick release, snap, bolt, or other means known in the mechanical arts may be used to couple the scanner 102 to the rigid, U-shaped bracket coupling member 1210.

Furthermore, FIG. 12A illustrates a transmission detector module 1206 that is built on to the U-shaped clamp bracket, particularly onto an interior surface thereof. In other embodiments, the transmission detector may be built into the bracket coupling member 1210. With ends 1251 of the bracket coupling member 1210 sitting over the pipe 108 and coupled to the portable x-ray scanner 102 in the coupled configuration illustrated in FIG. 12A, the motion of the scanner 102 and transmission detector module 1206 is constrained in the radial direction or directions 116. Thus, in this manner, the shape of the bracket coupling member 1210 forms the motion constraint feature, and the engaged system thus engaged with the pipe is prepared for scanning operation. It should be noted that the embodiment of FIG. 12A can include features of other embodiments, such as other example motion constraint features, transmission detector module features, and portable x-ray scanner features, etc.

FIG. 12B is a schematic block diagram illustrating portions of an embodiment pipe inspection system that includes the arm coupling members 1010 of FIG. 10-11, rotationally coupled to the scanner 102 via the hinge mechanisms 1040. In addition, the embodiment of FIG. 12B includes rotational actuators 1292 that are configured to rotate the arms 1010 into an engaged configuration with respect to a pipe (not illustrated in FIG. 12B). As needed, the rotational actuators 1292 can also rotate the arms 1010 into the disengaged configuration illustrated in FIG. 12B. The portable x-ray scanner 102 or arm coupling members 1010 may be modified to include buttons for example that an operator can push in order to actuate the arms as needed to engage or disengage with a pipe. For robotic applications, such as shown in FIG. 3, a remote electrical or wireless signal can be sent to actuate the arms. Moreover, it will be understood that linear actuators may be useful in some embodiments in order to cause an embodiment system to engage with a pipe or to disengage from a pipe as needed. In one example, a linear actuator may be used in connection with the embodiment of FIG. 9.

FIG. 13 is a schematic block diagram illustrating portions of an example embodiment pipe inspection system that includes mounting brackets 1358 and 1360 that form part of a coupling member 1310. The coupling member 1310 includes a main portion 1356, and the mounting bracket 1358 is used for coupling the main portion 1356 to the scanner 102. In similar fashion, the mounting bracket 1360 is used for coupling the main portion 1356 of the coupling member 1310 to the transmission detector module 106. The mounting brackets 1358 and 1360 may be detachable from the portable x-ray scanner, from the transmission detector module, or from both in order to decouple the scanner 102 and detector module 106 from each other.

Figures 14A, 14B:
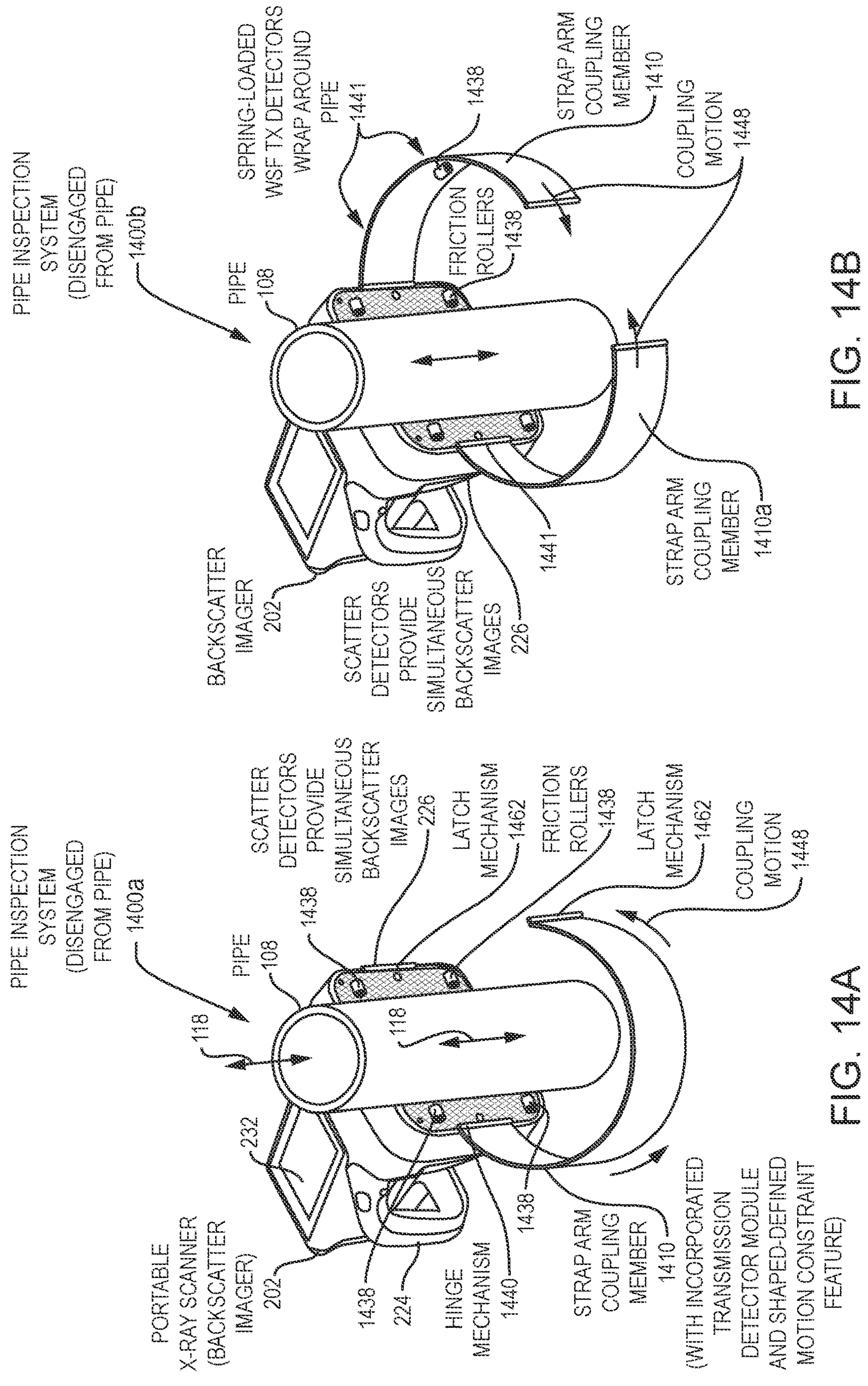
FIG. 14A is a perspective-view illustration of an embodiment pipe inspection system incorporating the portable x-ray scanner of FIG. 2 and a strap arm-type coupling member including an incorporated transmission detector module and shape-defined motion constraint feature.
FIG. 14B is a perspective-view illustration of an embodiment pipe inspection system that is similar to that of FIG. 14A, except that it includes a coupling member having two strap-type arms that can couple with each other in an engaged configuration.
Figures 14C, 14D:
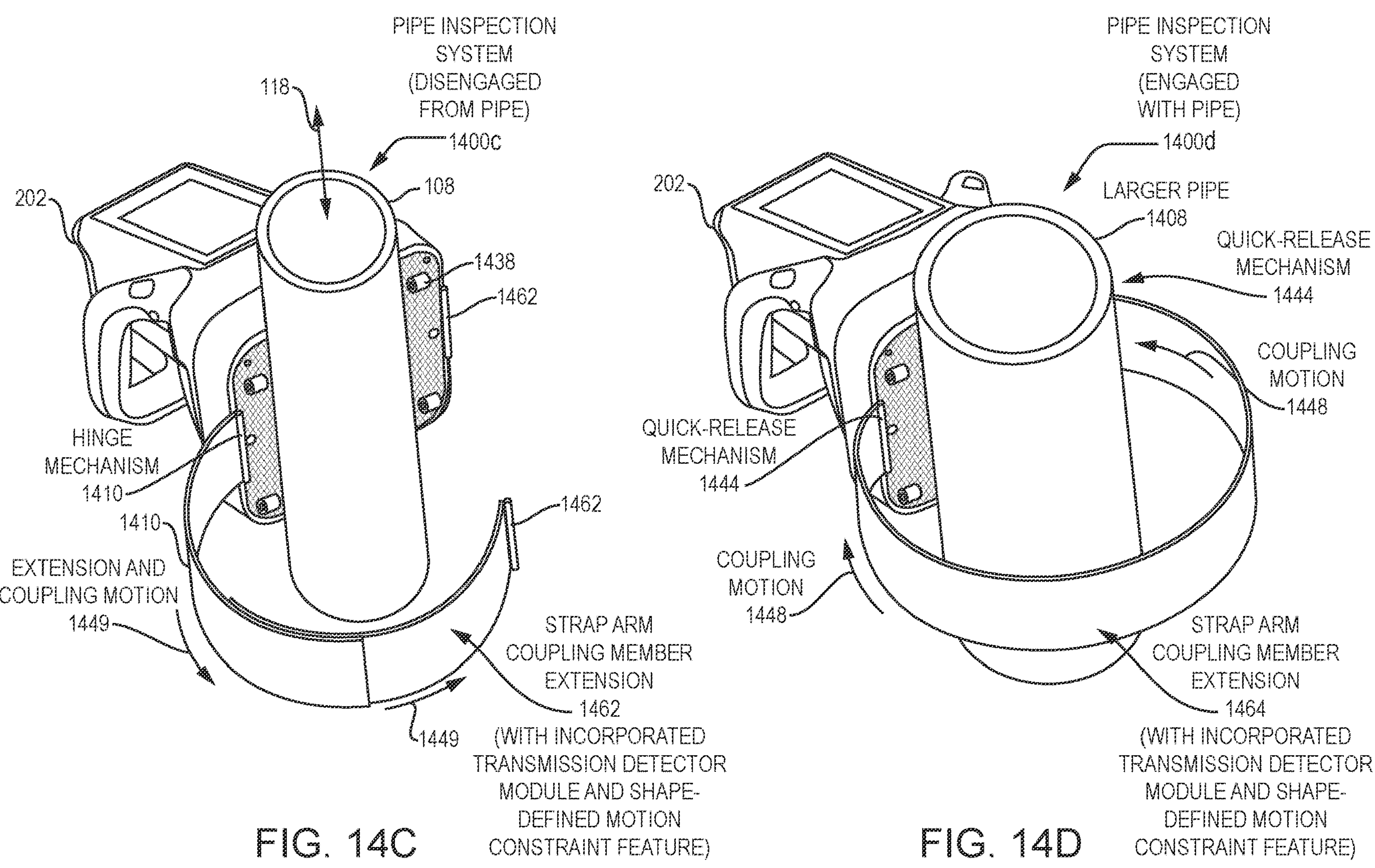
FIG. 14C is a perspective-view illustration of an embodiment pipe inspection system similar to those of FIGS. 14A-14B, except that the system of FIG. 14C includes a strap arm-type coupling member with an extension for accommodating different pipe sizes.
FIG. 14D is a perspective-view illustration of an embodiment pipe inspection system that is similar to those of FIGS. 14A-14C, except that the embodiment of FIG. 14D includes a single strap arm-type coupling member with a quick release mechanism for releasing the coupling member from the portable x-ray scanner.

FIG. 14A is a perspective-view illustration of a pipe inspection system 1400*a* that is disengaged from the pipe 108. The system includes the portable x-ray scanner 202 of FIG. 2 in order to provide a scanning beam of x-rays. The embodiment of FIG. 14A includes a strap arm-type coupling member 1410 that has an incorporated transmission detector module and shape-defined motion constraint feature included. Details of construction of the strap arm coupling member 1410 are further described hereinafter in connection with FIG. 16A, and FIG. 16B provides an alternative arrangement for strap arm coupling members. The coupling member 1410 includes latch mechanisms 1462 on a distal end thereof that engage with a corresponding latch mechanism 1462 attached to the scanner 202. The strap on coupling member 1410 can rotate freely about a hinge mechanism 1440 unless the coupling member 1410 is coupled to the scanner 202 at the distal end via the latch mechanism 1462. Upon engaging with the pipe 108 with a coupling motion 1448 by which the latch mechanisms 1462 are secured with each other, the pipe inspection system 1400*a* is then moved along the pipe 1084 to allow scanning and obtaining both transmission and backscatter images.

A shape of the strap arm coupling member 1410 in the engaged configuration provides a shape-defined motion constraint feature by which motion in various radial directions of the pipe is constrained.

The flexible strap arm coupling member 1410 provides many advantages, as will be understood in view of the description herein above and the description of further embodiments.

The pipe inspection system 1400*a* can also includes friction rollers 1438 that are attached to the portable x-ray scanner 202 in order to assist in constraining radial motion and to facilitate translational motion 118 of the system when engaged with the pipe 108. The friction rollers 1438 assist in providing smooth motion along the pipe 108 in the scan direction. Furthermore, the handheld scanner 202 may actually be gently pressed against the pipe, using the friction rollers 1438, in order to control and constrain the radial motion and to provide a smooth running surface along which to translate the portable x-ray scanner and strap on coupling member 1410 along the scan direction. Furthermore, as illustrated in connection with FIG. 14B, the friction rollers 1438 may be embedded in the strap arm as well, such that if the strap arm comes into contact with the pipe, smooth translational motion 118 is still facilitated. Because the portable x-ray scanner 202 is used, the scatter detectors 226 provide signals for backscatter images to be acquired simultaneously with the transmission images that are provided by signals from the incorporated transmission detector module described further hereinafter.

FIG. 14B is a perspective-view illustration of an embodiment pipe inspection system 1400*b* that is disengaged from the pipe 108. The system 1400*b* includes two strap arm coupling members 1410*a* and 1410*b*, both of which are hingedly connected to the scanner 202 via hinge mechanisms 1440. The strap arm coupling members 1410*a* and 1410*b* are built similar to the strap coupling member 1410 described in FIG. 14A, such that a transmission detector module is incorporated therein, and the strap arm coupling members 1410*a* and 1410*b* provide shape-defined motion constraint feature. The strap arms may be coupled to each other with a coupling motion 1448, by which distal end of the strap arms are brought together and connected via a magnetic linkage, a latch, or other mechanical means as known in the art.

Furthermore, the strap arm coupling members 1410*a* and 1410*b* can be spring-loaded such that they remain coupled to each other and engaged with the pipe 108, absent external force applied. The spring loading is provided by means of the hinge mechanisms 1440 at the proximal ends of the strap arm coupling members. Furthermore, as illustrated hereinafter in connection with FIGS. 15A-15B, this arrangement is particularly advantageous to accommodate pipes of different sizes and to facilitate fast and easy engagement with a pipe and disengagement there from for an operator during operation.

FIG. 14C is a perspective-view diagram of a pipe inspection system 1400*c*, disengaged from the pipe 108, which includes an extendable strap arm coupling member 1410. The extension is provided via a strap on coupling member extension 1462 that has construction similar to that of the strap on coupling member 1410. Namely, the strap arm coupling member extension 1462 includes an incorporated transmission detector module and shape-defined motion constraint feature. This is similar to the arrangement described in relation to FIGS. 14A-14B, where, in an engaged configuration, radial motion with respect to the pipe 108 is limited and constrained, and translational motion along the axial direction 118 is facilitated by means of rollers 1438. It should be noted that the rollers 1438 in FIGS. 14A-14B and 14C-14D can be replaced by ball bearing mechanisms, with ball bearings embedded in bearing races, as will be understood by those of skill in the mechanical arts.

With an extension and coupling motion 1449, the strap arm coupling member extension 1462 can slide with respect to the member 1410 to extend a total length of the strap arm coupling member, transmission detector module, and motion constraint feature, altogether. Latch mechanisms 1462 are connected in this embodiment to the strap arm extension 1462 and the scanner 202 and can be coupled to each other and secured in the engaged configuration. With the flexibility provided by the strap arm coupling member extension 1462, the shape-defined motion constraint can be automatically appropriate, while the total strap arm length can be adjusted to accommodate inspection of pipes of different sizes.

FIG. 14D is a perspective-view diagram of an embodiment pipe inspection system 1400*d* engaged with a pipe of larger diameter 1408. In this embodiment, a single strap arm coupling member 1464, with an incorporated transmission detector module and shape defined motion constraint feature, is coupled to the scanner 202 with coupling motions 1448. Coupling between the strap arm coupling member 1464 and scanner 202 is provided via quick release mechanisms 1444 on either side of the scanner 202. These quick release mechanisms can include complementary magnets, that allow a certain amount of rotational flexibility of the strap arm coupling member 1464 about the mechanism 1444.

FIG. 15A is a perspective-view diagram of the pipe inspection system of FIG. 14B engaged with a smaller pipe 108. When engaged with the smaller pipe, the spring-loaded hinge mechanisms 1441 cause the strap arm coupling members 1410*a* and 1410*b* to have a relatively greater overlap 1566, automatically adjusting thereby the degree of shape defined radial motion constraint.

FIG. 15B also is a perspective-view diagram of the system 1400*b* from FIG. 14B, engaged with a relatively larger pipe 1408. In this engaged configuration, the spring-loaded hinge mechanisms 1441 cause the strap arm coupling members 1410*a* and 1410*b* to have a relatively lesser overlap 1568. Thus, again, in this application to the larger pipe 1408, the degree of shape-defined motion constraint, provided by the shape of the strap arm coupling members 1410*a* and 1410*b*, is automatically adjusted. Furthermore, as shown in FIGS. 15A-1B, this embodiment greatly facilitates pipe inspection, in that the strap arm coupling members 1410*a* and 1410*b* can easily be decoupled for disengagement from a pipe, coupled again via the coupling motion 1448 provided by the spring loading of the spring hinge mechanisms 1441 shown in FIG. 14B, for easy, flexible, inspection of pipes of different sizes in a simple manner without difficulty of alignment or adjustment.

FIG. 16A is an open perspective-view diagram illustrating detailed construction of the strap arm coupling members 1410, 1410*a*, 1410*b*, and the strap arm coupling member extension 1462 described in connection with FIGS. 14A-14D and 15A-15B, for example. A minimal flexibility, but also a degree of stiffness and protection of a strap arm coupling member structure, is provided by a plastic casing arm coupling member 1610. The plastic casing arm coupling member 1610 encases a wavelength shifting fiber (WSF) ribbon 1672. The WSF ribbon 1672, together with a scintillator screen 1670 and a mini photomultiplier tube (PMT) 1674 together constitute the example transmission detector module. The module is built together with the plastic casing arm coupling member 1610 to form the strap arm coupling members 1410, 1410*a*, 1410*b*, 1462, and 1464 illustrated in FIGS. 14A-14B, 14A-14D, 15A-15B, respectively.

In particular, while the plastic casing arm is sufficiently rigid to provide a shape defined motion constraint feature, it is also flexible enough to be opened and closed around a pipe for engagement and disengagement, as well as flexible overlap as illustrated in FIGS. 15A-15B. The scintillator material, particularly the scintillator screen 1670, is configured to be mechanically coupled to the plastic casing arm coupling member 1610. The scintillator screen 1670 is a strip of scintillator phosphor screen, and the ribbon of WSFs are optically coupled to the scintillator screen 1670. Scintillation photons that are produced by the scintillator screen 1670 upon the interaction of an x-ray within the screen material can be detected by the WSF ribbon 1672, and at least one end of the ribbon 1672 is optically coupled to a photodetector, in this embodiment a PMT 1674.

FIG. 16B is an illustration of an alternative strap arm coupling member structure 1610 that can be used in place of the strap arm coupling members structure illustrated in FIG. 16A. In FIG. 16B, and aluminum spine arm coupling member 1607 provides both the flexibility and the rigidity fulfilling the purposes described in connection with FIG. 16A, including forming, by its shape, a motion constraint feature that can be used in the straps illustrated in FIGS. 14A-14D and 15A-15B, for example. The WSF ribbon 1672 is optically coupled to a scintillator screen 1671, particularly BaFCl:Eu scintillator screen, for receiving and guiding the scintillation photons. In turn, at least one end of the WSF ribbon 1672 is optically coupled to a photodetector, such as a mini PMT 1674. It should be understood that in both the embodiments of FIGS. 16A-16B, additional WSF ribbons may be used, each having an optical coupling to at least one photodetector at least at one end of the ribbon for appropriate detection of the signals. The alternative strap arm coupling member structure 1610 also illustrates the hinge mechanism 1440 previously described, mechanically coupled to the aluminum spine arm coupling member 1607 for use in an embodiment pipe inspection system. The structures illustrated in FIGS. 16A-16B can be shrink-wrapped, in their entireties, such as in a black, light-proof plastic, with the exception that the hinge mechanism 1440 should remain free.

The structures illustrated in FIGS. 16A-16B may also be modified to use a dual x-ray energy design in order to provide information about a spectral content of x-rays transmitted through the pipe, as described further in connection with FIG. 17.

FIG. 17 is an illustration of a WSF arrangement that can be used to provide signals representing different x-ray energy ranges. This arrangement can be used in the transmission detector modules in all the example embodiments discussed. Example incident x-rays from the scanning beam of x-rays 104 are incident at a scintillator volume 1770 with a thickness that separates a low energy WSF fiber ribbon 1772*a* and a high-energy WSF ribbon 1772*b*. Scintillation light from relatively lower energy x-rays 1776 absorbed near the entrance surface of the scintillator volume tends to be detected by the low energy WSF ribbon 1772*a*, while scintillation light from relatively higher energy x-rays 1778 absorbed deeper in the scintillator volume tends to be optically coupled into the high-energy WSF 1772*b*. The low energy WSF 1772*a* and high-energy WSF ribbon 1772*b* are then optically coupled into at least two separate photodetectors, such as the mini PMTs 1674 of FIGS. 16A-16B. In this manner, two different signals corresponding to two different x-ray energy ranges are provided to a unit such as the portable x-ray scanner 202 or the portable x-ray scanner 1002 of FIG. 10 with the processor 1046 for further analysis and imaging capability. The relative size of the two signals can be used to provide material discrimination information in different regions of the object being imaged.

Figure 18:
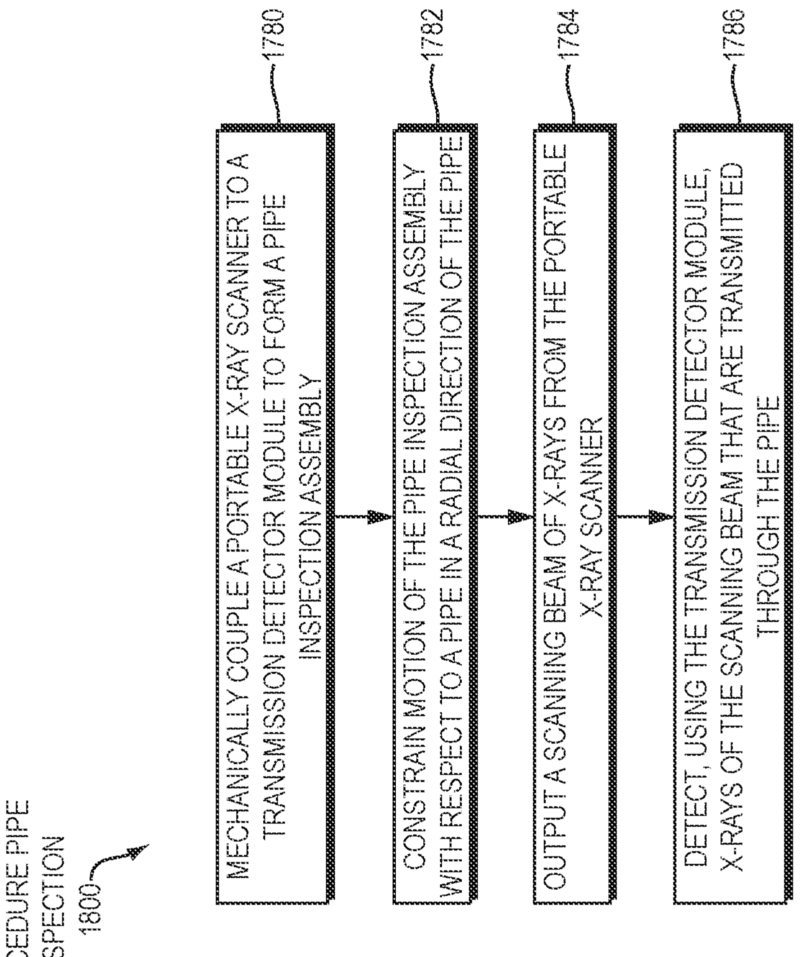
FIG. 18 is a flow diagram illustrating an embodiment procedure for pipe inspection.

FIG. 18 is a flow diagram illustrating an embodiment procedure 1804 pipe inspection. At 1780, a portable x-ray scanner is mechanically coupled to a transmission detector module to form a tight inspection assembly. At 1782, motion of the pipe inspection assembly is constrained with respect to a pipe in a radial direction of pipe. At 1784, a scanning beam of x-rays is output from the portable x-ray scanner. At 1786, using the transmission detector module, x-rays of the scanning beam that are transmitted through the pipe are detected.

It should be understood that the procedure 1800 in FIG. 18 may be performed, for example, by the embodiment pipe inspection system 100 illustrated in FIGS. 1A-1B. Furthermore, the procedure 1800 may be modified as will be understood in view of this disclosure, to perform pipe inspection using features described in connection with any of the other embodiment systems and components thereof described in connection with FIGS. 2-11, 12A-1B, 13, 14A-14D, 16A-16B, and 17. For example, the procedure 1800 can further include translating the pipe inspection assembly in an axial direction of the pipe to perform scanning, and, if desired, imaging, of various lengths along a pipe.

FIG. 19 (prior art) is a perspective-view schematic illustration of an x-ray imaging system that uses a scanning x-ray beam, which can be used for x-ray backscatter imaging, or for x-ray transmission imaging, or both. FIG. 19 provides further context for imaging with a scanning x-ray beam as a background, showing basic principles of such imaging, such that the novel features of present embodiments may be understood more fully.

In the system of FIG. 19, a standard x-ray tube 22 generates the x-ray radiation 6 that is incident at an attenuating plate 24. The radiation is collimated into a fan beam 4 by a slot in attenuating plate 24, and the fan beam 4 is incident at a source side 52 of the disk chopper wheel 2, where the source side 52 is the side of the chopper wheel that is closest to the x-ray source 22. The fan beam is then “chopped” into a pencil beam by the rotating “chopper wheel” 2 with slits 12. The pencil beam is output through an output side 54 of the disk chopper wheel (the side opposite the x-ray source 22) and scans over the target object 30 being imaged as the wheel rotates with the rotation 3. The intensity of the x-rays scattered in the backwards direction is then recorded by one or more large-area backscatter detectors (not shown) as a function of the position of the illuminating beam to form a backscatter image. In addition, the intensity of the transmitted x-rays can be recorded by a transmission detector 28 to create a transmission x-ray image simultaneously.

A signal cable 26 carries scan line signals from the detector 28 to the monitor 40. By moving the object through the plane containing the scanning beam, either on a conveyor 27 or under its own power, a two-dimensional backscatter image of the object is obtained. Alternately, the object can be stationary, and the imaging system can be moved relative to the object.

It should be understood that the pipe inspection systems and methods described above may be referred to more generally as target inspection systems and methods, as they may be applied to other types of targets other than pipes. A motion constraint feature may constrain motion with respect to a car door, elongated type of target, or other target, and pipes are only one of many types of targets to which embodiments can be applied advantageously.

Particular Embodiments With Single-Sided Coupling Arm Coupling Members

In the last few years, handheld x-ray backscatter imaging devices have been introduced into the market, enabling an operator to rapidly inspect suspect vehicles, packages, or other objects. These devices have been designed to be relatively compact and lightweight, allowing them to be easily operated for extended periods of time. An example of a 120 kV backscatter x-ray imaging system manufactured by the Viken Detection Corp. is shown in FIG. 2.

Figure 20:
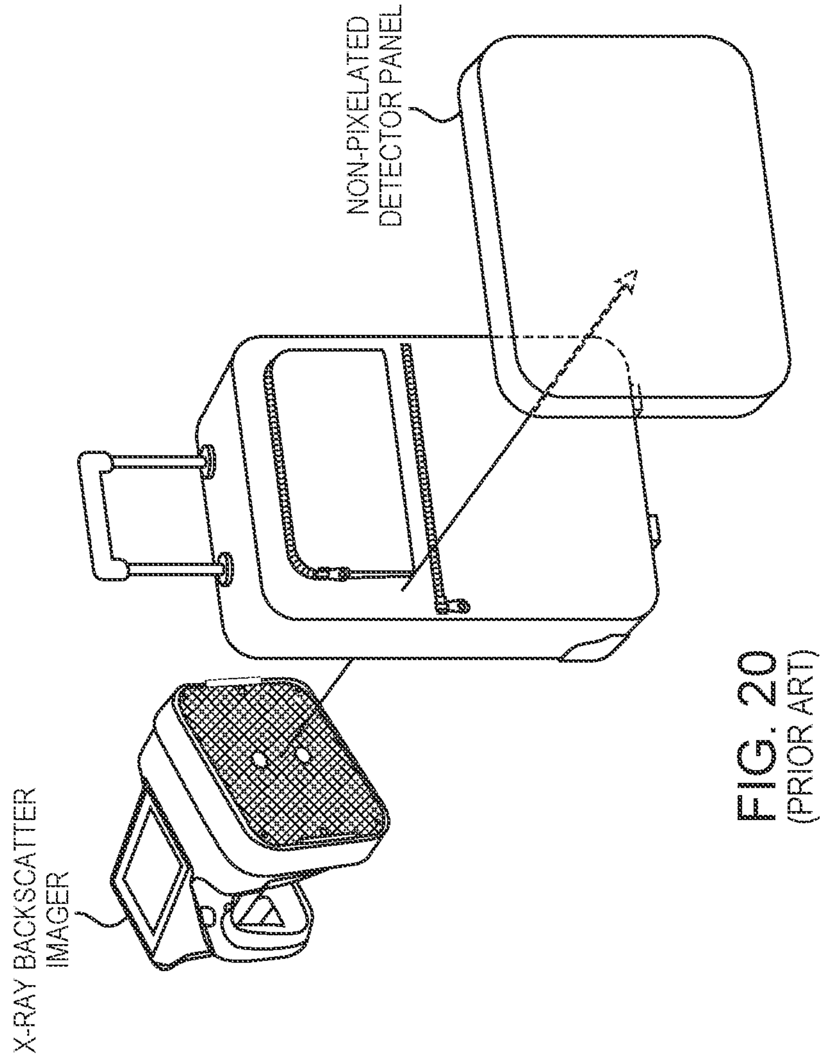
FIG. 20 (prior art) is a perspective-view drawing showing how a scanning imager can be used to obtain an x-ray transmission image.
Figure 23:
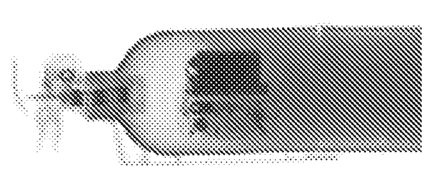
FIG. 23 (prior art) is an image that is comparable to FIG. 22, except that it is acquired with a cone beam of x-rays and a pixelated flat-panel detector.
Figure 22:
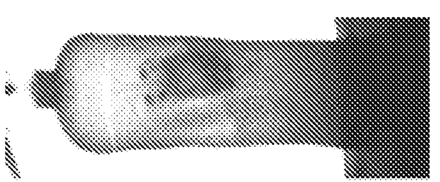
FIG. 22 (prior art) is a photograph showing an image of an explosive device concealed inside a fire extinguisher, acquired with a scanning pencil beam from a handheld backscatter imager combined with a non-pixelated detector panel.
Figure 21:
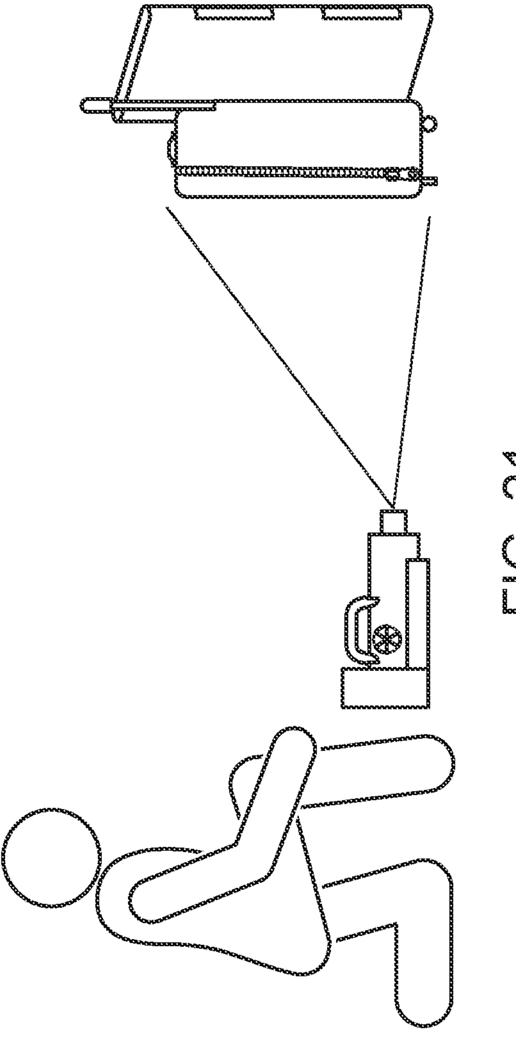
FIG. 21 (prior art) illustrates use of an x-ray source having a wide, stationary beam to obtain a transmission image in portable fashion for an example bomb detection application.

In addition to backscatter imaging, these instruments can obtain transmission images of an object by placing a non-pixelated (i.e. single-channel) x-ray detector panel behind the object being imaged as shown in FIG. 20. The detector panel intercepts the sweeping beam after it has passed through the object, allowing a transmission image to be created simultaneously with the acquisition of the backscatter image. A limitation of this approach, however, is that the resolution of the transmission image can be relatively low, as the imaging resolution is defined by the size of the sweeping pencil beam as it passes through the object being imaged. For example, the pencil beam can be ~5 mm in width at about 30 cm from the front of a small handheld backscatter imaging instrument, creating transmission images that can be perceived as being out of focus, or blurry. This is especially the case when the transmission images are compared with an image acquired with a very-high resolution pixelated flat-panel detector illuminated by a cone beam of x-rays, as typically used in the field by bomb disposal technicians and depicted in FIG. 22. For example, in FIG. 22, an image of an explosive device concealed inside a fire extinguisher, acquired with a pencil beam from a handheld backscatter imager combined with a non-pixelated detector panel, is compared with a comparable image acquired with a cone beam of x-rays and a pixelated flat panel detector as shown in FIG. 23. It can be seen from these images that the resolution of the latter is far superior to the former. However, the transmission image obtained with a sweeping beam can be improved using the approaches described in pending application "Segmented Dual-Energy X-Ray Detector for X-Ray Imaging" and co-pending application "Transmission Detector for X-Ray Imaging with Repeating Scintillating Structures."

Further embodiments disclosed in this application hereinafter include an open-geometry transmission detector that can be attached to a handheld x-ray imager and enables convenient imaging of larger objects, such as car doors, car seats, and items such as backpacks. The existing stationary flat panel detectors used to acquire transmission images shown in FIG. 20 are typically not convenient for imaging most objects for several reasons.

1. The stationary detector panel must first be carefully positioned behind the object prior to it being scanned
2. The detector panel is often not in the optimal position, and typically needs to be repositioned several times to acquire the optimal image
3. The detector panel needs to be large to cover even a relatively modest sized object such as a backpack, due to the divergence of the x-ray beams emitted by the imager
4. Due to its large area, a detector panel is very susceptible to the negative effects of in-scatter, which consists of multiply-scattered x-rays that cloud the image A transmission detector attached to the x-ray imager does not suffer from these four disadvantages. Since it is mechanically coupled to the imager, the detector is automatically positioned in the optimal position for acquiring the image. The detector does not have to be a large area detector that is susceptible to in-scatter but can be a thin strip detector that only needs to be wide enough to intercept the beam.

Certain transmission detectors have been described in the previously filed, pending PCT application No. PCT/US2021/072141, entitled "X-Ray Pipe Inspection System," filed on Oct. 29, 2021, the disclosure of which is incorporated by reference herein in its entirety. The described detectors can be attached to a handheld x-ray imager, but they are designed to enclose the pipe completely. Because these detectors are designed to enclose fully the object being inspected, they do not lend themselves to scanning larger objects. The prior embodiment shown in FIG. 14C has one extendable curved detector arm that fully encloses the pipe when it is engaged, as shown in FIG. 14D. The prior embodiment shown in FIG. 14B has two curved detector arms mounted on each side of the imager, that fully enclose the pipe when engaged as shown in FIG. 15B.

Figure 24:
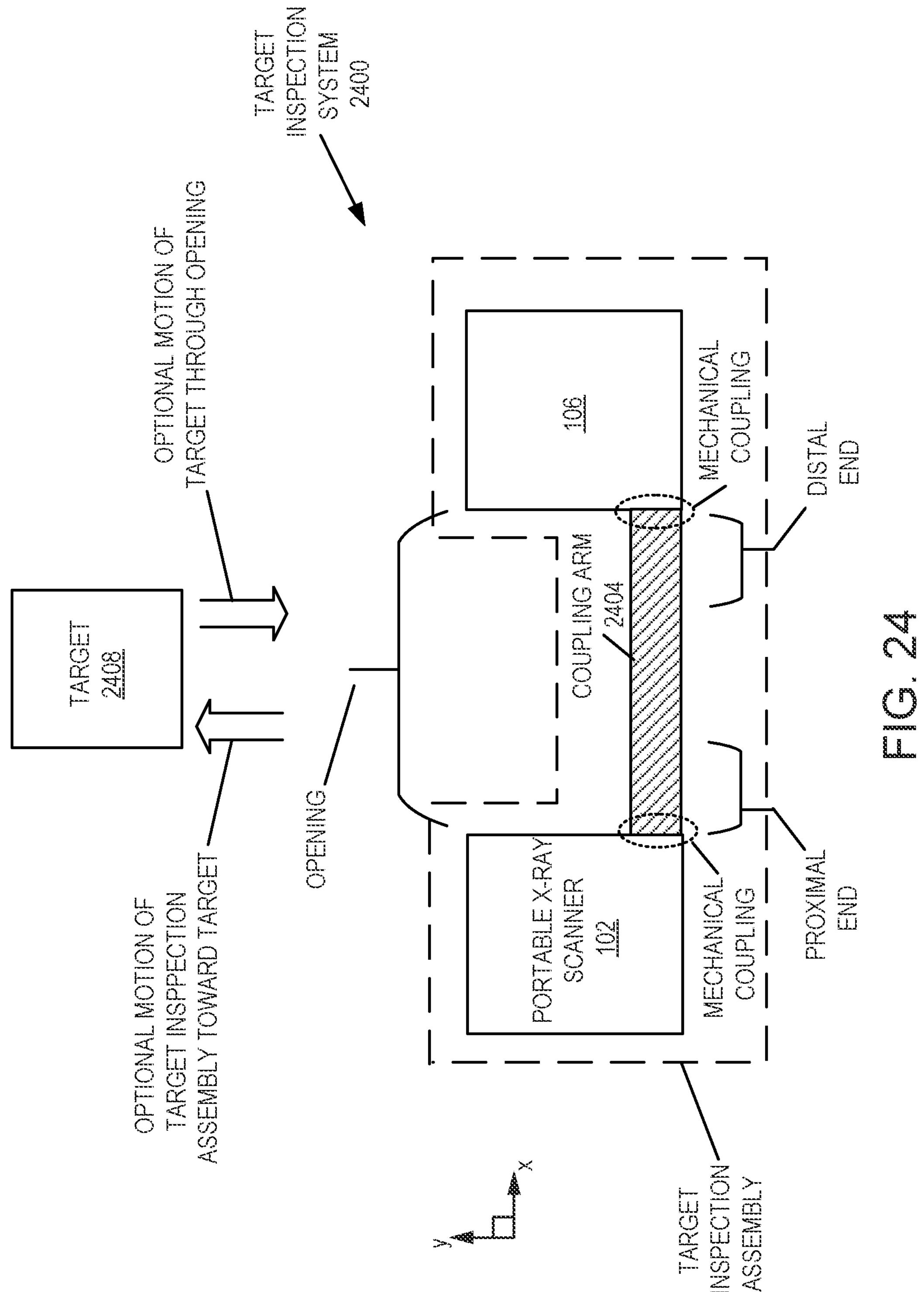
FIG. 24 is a schematic diagram illustrating an embodiment target detection system.
Figures 25, 26:
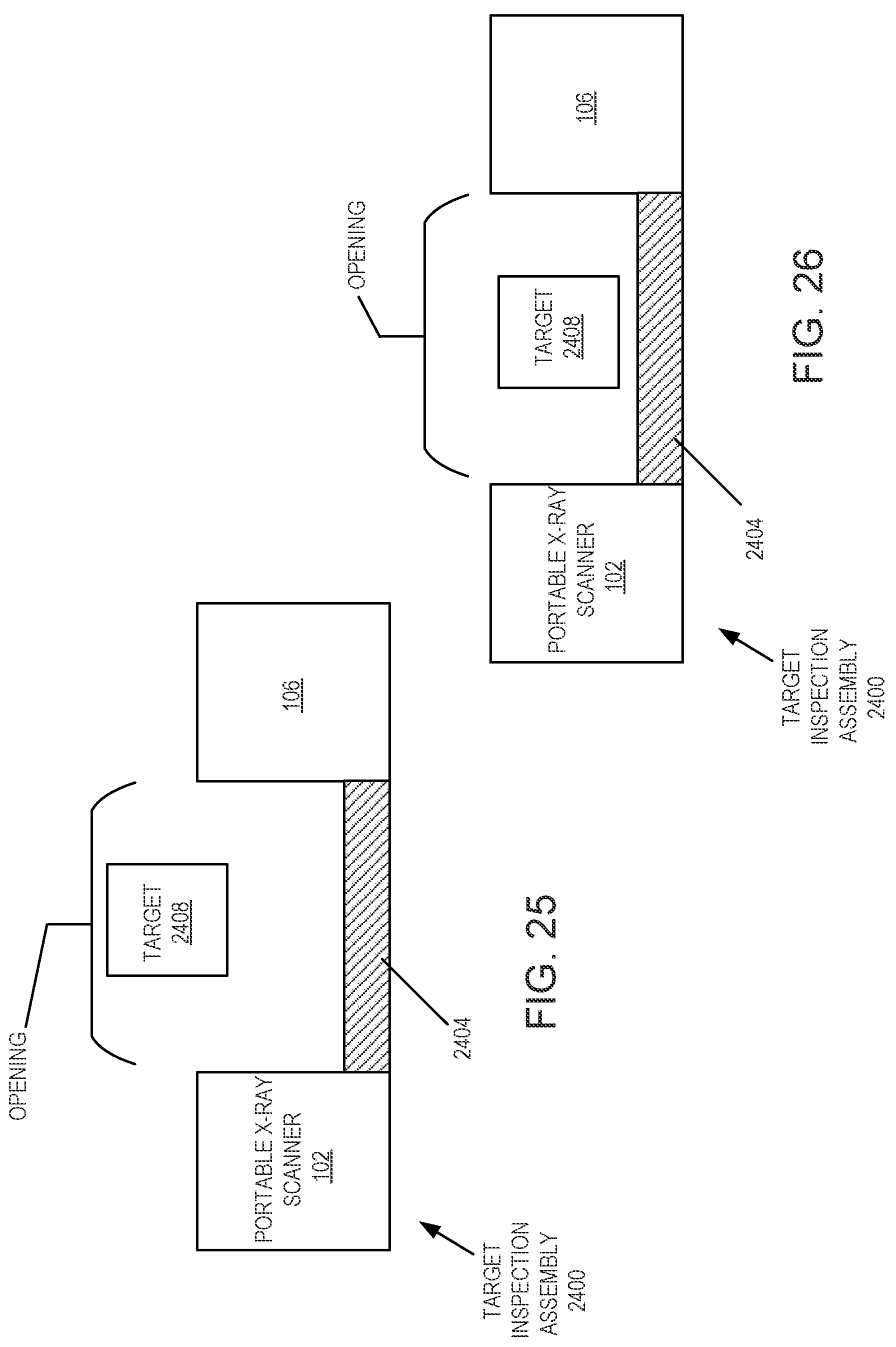
FIG. 25 is a schematic diagram illustrating the target inspection system of FIG. 24, with a target partially interposed between the portable x-ray scanner and the transmission detector module.
FIG. 26 is a schematic diagram similar to that of FIG. 25, except that the target is completely interposed between the portable x-ray scanner and the transmission detector module.
Figure 27:
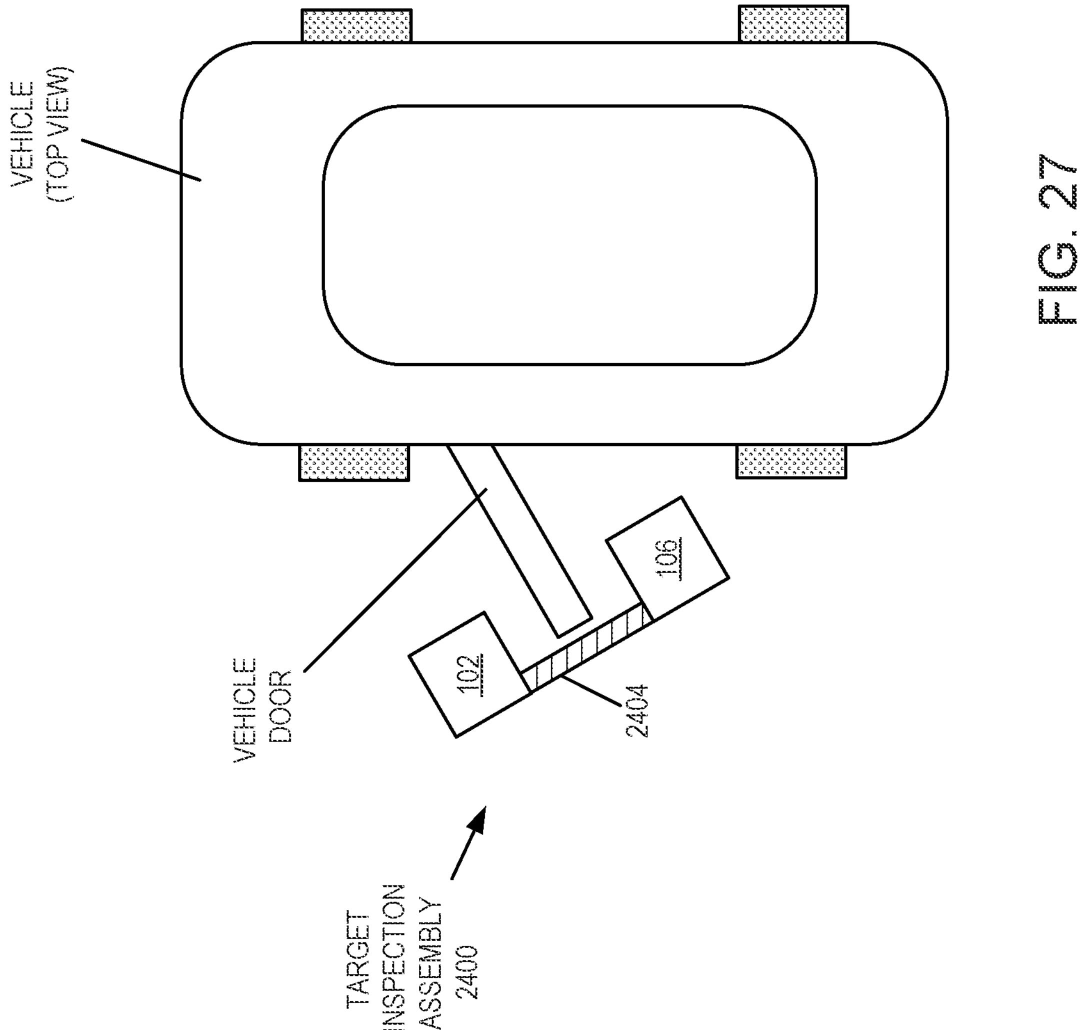
FIG. 27 is a schematic diagram illustrating use of the target inspection system of FIGS. 24-26 on a vehicle door target example.

Consistent with FIG. 24, it will be understood that a target inspection system can include a) a portable x-ray scanner configured to output a scanning beam of x-rays;

b) a transmission detector module configured to detect x-rays of the scanning beam of x-rays that are transmitted through a target when the target is interposed between the portable x-ray scanner and the transmission detector module; and c) a coupling arm configured to couple the portable x-ray scanner to the transmission detector module mechanically to form a target inspection assembly, via a mechanical coupling between the coupling arm and the portable x-ray scanner at a proximal end of the coupling arm, and via a mechanical coupling between the coupling arm and the transmission detector module at a distal end of the coupling arm, the transmission detector module and the portable x-ray scanner mechanically coupled together via the coupling arm defining an opening configured to receive the target to be interposed therebetween for an x-ray scanning operation.

By "interposed therebetween," it is meant that when the transmission detector module and the portable x-ray scanner are mechanically coupled together via the coupling arm, they thus form a structure that can extend partially around the target.

The embodiment described in connection with FIG. 24 may include various optional features that may be readily understood with reference to the figures described hereinafter, and, in some aspects, with reference to the figures described hereinabove. Some of these features include the following items:

The target inspection system of FIG. 24, wherein the portable x-ray scanner is configured to be handheld.

The target inspection system of FIG. 24, wherein the transmission detector module is configured to have an effective active detection area that is adjustable with respect to a given field of the x-rays that are transmitted through the target. (i.e., the transmission detector receives/intercepts a variable cross-sectional portion of the transmitted x-rays. Effective active detection area can be adjusted to be smaller than the actual active detection area of the detector defined when the x-rays illuminate the detector normal to its surface.)

The target inspection system of FIG. 24, wherein the mechanical coupling between the coupling arm and the transmission detector module is a rotational mechanical coupling that is configured to enable the transmission detector module to be rotated to adjust the effective active detection area.

The target inspection system of FIG. 24, wherein the coupling arm is mechanically coupled to the portable x-ray scanner at the proximal end of the coupling arm via a hinge mechanism. Furthermore, the hinge mechanism can be configured to permit the coupling arm to be mechanically decoupled from the portable x-ray scanner upon application of external force. Moreover, the hinge mechanism can include a magnetic linkage.

The target inspection system of FIG. 24, wherein the coupling arm includes a mounting bracket configured for mechanically coupling the transmission detector module to the portable x-ray scanner, the mounting bracket being detachable from the portable x-ray scanner, the transmission detector module, or both.

The target inspection system of FIG. 24, wherein the coupling arm is configured to be mechanically decoupled from the portable x-ray scanner, the transmission detector, or both.

The target inspection system of FIG. 24, wherein the coupling arm includes one or more adjustable joints situated between the proximal and distal ends of the coupling arm. The coupling arm can further include two or more adjustable joints situated between the proximal and distal ends of the coupling arm. ("Between" means not "at" or used for direct mechanical coupling to the portable x-ray scanner or to the transmission detector module.)

The target inspection system of FIG. 24, wherein the portable x-ray scanner includes two or more connection points on different respective sides of the portable x-ray scanner.

The target inspection system of FIG. 24, wherein the transmission detector module includes a scintillator material configured to be mechanically coupled to the coupling arm.

The scintillator material can include at least one strip of scintillator phosphor screen, the transmission detector module further including one or more ribbons of wavelength shifting fibers (WSFs) optically coupled to the at least one strip of scintillator phosphor screen. The transmission detector module further can also include a photodetector, at least one end of a ribbon of the one or more ribbons of WSFs being optically coupled to the photodetector. The photodetector can be a photomultiplier tube (PMT).

The target inspection system of FIG. 24, wherein the coupling arm has an adjustable length.

The target inspection system of FIG. 24, wherein the transmission detector module includes a non-pixelated detector that detects x-rays of the scanning beam that are transmitted through the target over a scan of the scanning beam.

The target inspection system of FIG. 24, wherein the transmission detector module is configured to provide information about a spectral content of the transmitted x-rays.

The target inspection system of FIG. 24, wherein the portable x-ray scanner includes a backscatter detector that is configured to detect x-rays of the scanning beam that are backscattered by the target.

The target inspection system of FIG. 24, further including an output interface configured to output image data for providing an image of the target for inspection of the target. The output interface can be further configured to output transmission image data.

The target inspection system of FIG. 24, further including one or more lasers mounted at the portable x-ray scanner and configured to indicate a position of the scanning beam of x-rays for alignment of the transmission detector module with the scanning beam ("at" meaning on, in, about, around).

More generally, an embodiment target inspection system can include:

a) means for mechanically coupling a portable x-ray scanner to a transmission detector module via a coupling arm to form a target inspection assembly, including mechanically coupling the coupling arm to the portable x-ray scanner at a proximal end of the coupling arm, the coupling arm mechanically coupled to the transmission detector module at a distal end of the coupling arm, wherein the mechanically coupling the portable x-ray scanner to the transmission detector module further forms an opening between the portable x-ray scanner and the transmission detector module;

b) means for interposing a target between the portable x-ray scanner and the transmission detector module, at the opening, in an interposed configuration;

c) means for outputting a scanning beam of x-rays from the x-ray scanner; and d) means for detecting, using the transmission detector module, x-rays of the scanning beam that are transmitted through the target in the interposed configuration.

In another embodiment, a target inspection system includes:

a) a portable x-ray scanner configured to output a scanning beam of x-rays; and b) a transmission detector module configured to detect x-rays of the scanning beam of x-rays that are transmitted through a target when the target is interposed between the portable x-ray scanner and the transmission detector module, wherein the transmission detector module is configured to have an effective active detection area that is adjustable with respect to a given field of the x-rays that are transmitted through the target.

The target inspection system of the previous paragraph can have the portable x-ray scanner configured to be handheld.

The target inspection system can also include a rotational mechanical coupling between the portable x-ray scanner and the transmission detector module, the rotational coupling configured to enable the transmission detector module to be rotated to adjust the effective active detection area. This can provide for indirect rotational coupling, such as via a coupling arm.

Figure 28:
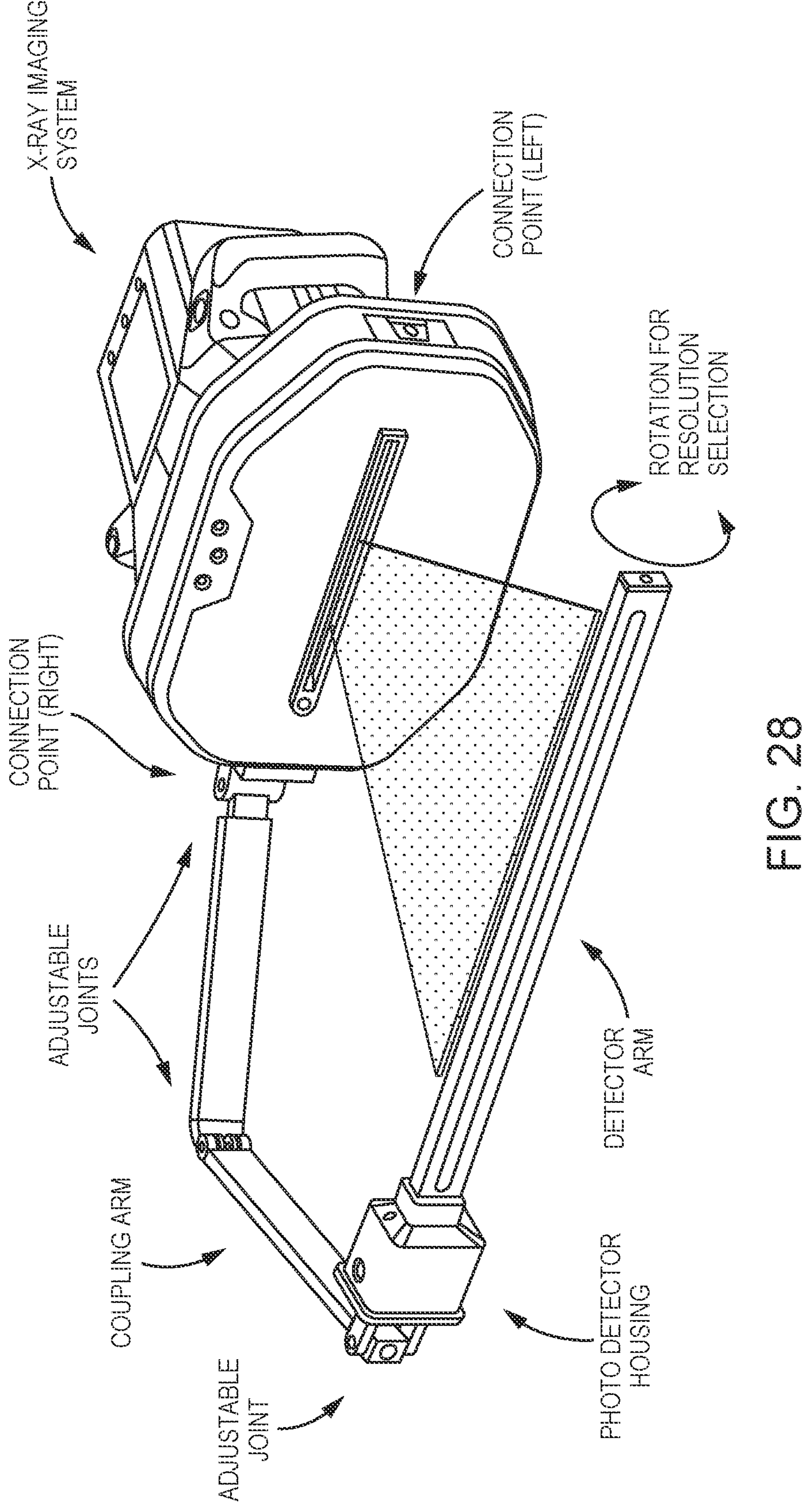
FIG. 28 is a perspective view illustration of an embodiment target inspection system that includes a handheld portable x-ray scanner, a coupling arm that includes multiple adjustable joints, and a transmission detector module that is rotatably coupled to the coupling arm and is rotatable for selection of resolution of a transmission image.

One preferred embodiment is shown in FIG. 28. The x-ray transmission detector arm is attached to the front end of the imager via a coupling arm at only one end in an open-geometry configuration, allowing the object being scanned to be easily positioned between the imager and the detector as the imager is moved relative to the object during the acquisition of the image. In a preferred embodiment, the position of the detector arm that is intercepting the sweeping x-ray beam transmitted through the object can be adjusted relative to the imager at one or more adjustable joints on the coupling arm, allowing smaller or larger objects to be imaged, or to allow objects such as car tires or doors to be imaged. In some applications, it can be advantageous to be able to position the detector arm at an angle to the front of the x-ray imager.

The embodiment shown in FIG. 28 has three adjustable joints on the coupling arm, allowing the detector arm to be aligned with the incident beam, and to provide enough space between the detector arm and the front of the imager to contain the object being scanned. The coupling arm can be rapidly connected to the x-ray imager via a snap-connection that can provide both mechanical and electrical coupling. Rapidly attachable/detachable connection points can be provided on both sides of the x-ray imager as shown in FIG. 28, allowing the operator more flexibility when imaging.

In a preferred embodiment, the detector arm contains a strip of scintillator (such as scintillating phosphor) with the scintillation light collected using wavelength shifting fibers (WSF). At least one end of the fibers is coupled to at least one photodetector, such as a photomultiplier tube (PMT), as described in connection with FIGS. 16A and 16B. Alternative embodiments can use scintillator rods that act as light guides, or hollow light guides lined with reflective material that direct the scintillation light from an enclosed scintillator to photodetectors at one or more ends of the lightguide.

The detector can be a single-energy detector that produces black and white transmission images, or it can be a dual-energy detector that provides material identification and colorized transmission images. The transmission detector can be a standard sandwich-type detector that requires two or more stacked scintillator volumes or alternatively, can use a single volume of scintillator optically coupled to two layers of WSF as shown in FIG. 17.

Further embodiments of the transmission detector can include one or more lasers mounted on the x-ray imaging system to assist in aligning the active input region of the transmission detector with the incident sweeping beam. The illumination spots of the lasers at each end of the detector arm can be used to provide feedback cues for adjusting the coupling arm to provide optimal alignment of the beam with the scintillator volume. Other embodiments can include fiducial markers that are visible in the transmission x-ray image itself to provide information on the quality of the beam alignment when acquiring a particular image.

Other embodiments of the transmission detector can have at least one spring-loaded coupling that provides some shock protection should the detector strike an object or get stuck when performing a scan. Other embodiments can include a transmission detector kit, which includes detector arms of different lengths and which can be advantageously used to scan objects under various conditions and with differing accessibility challenges.

Another embodiment of the transmission detector provides variable resolution along the scan direction (i.e. the direction of relative motion of the imager with respect to the object). The width of the scintillator strip intercepting the transmitted beam determines the maximum width of the beam that is detected and contributes to the image, and therefore determines the resolution of the transmission image in the scan direction. If the width of the scintillator strip perpendicular to the incident beam direction is smaller than the width of the beam at the point it intercepts the detector, then the image resolution will be defined by the perpendicular width of the scintillator, and not the width of the beam, resulting in higher resolution. If the scintillator strip is wider than the beam, then the image resolution is defined by the width of the beam, resulting in lower resolution. By rotating the detector arm relative to the incident beam (curved arrow in FIG. 28), the scintillator strip presents a varying width to the incident beam.

Figures 29, 30:
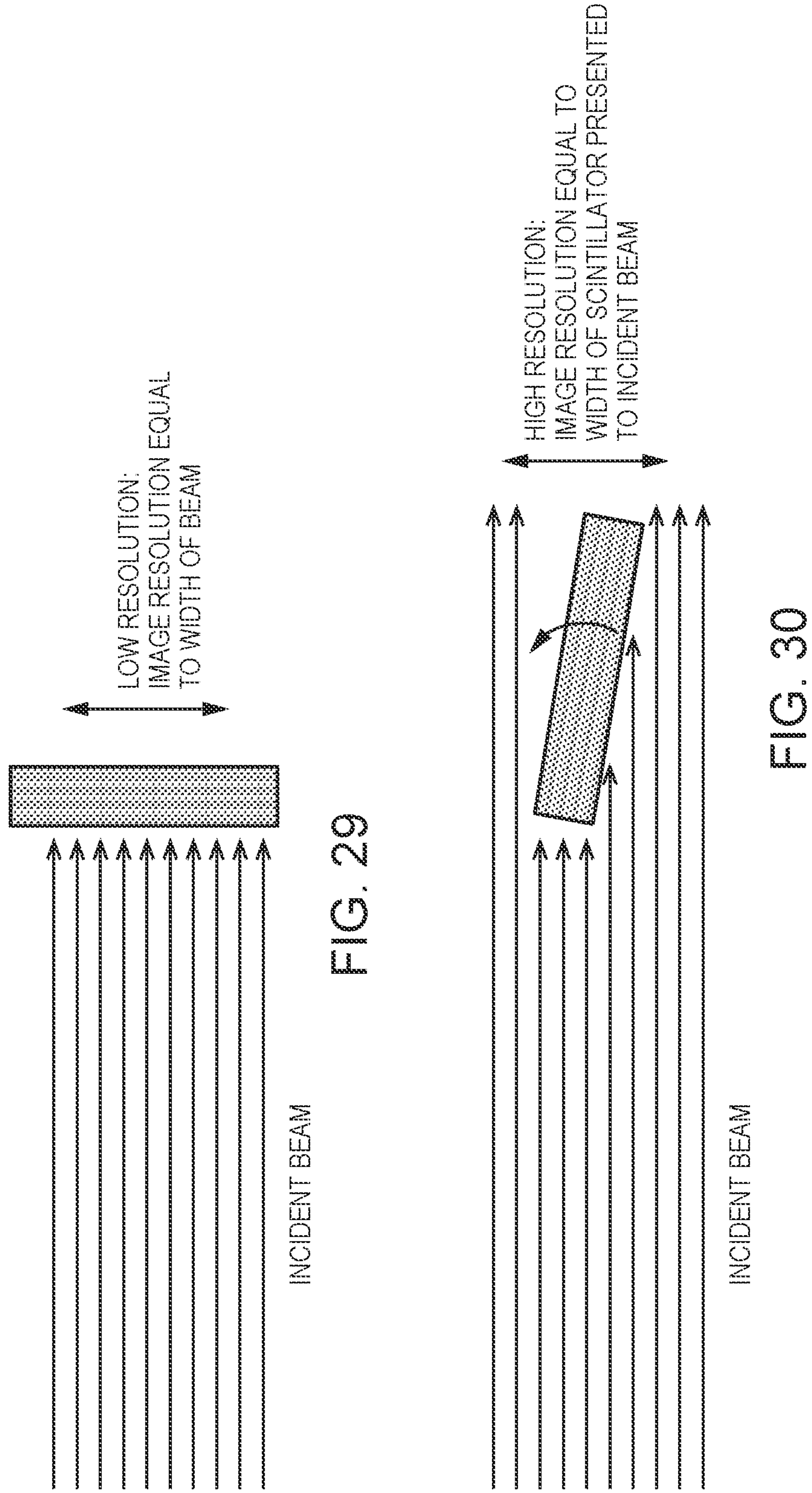
FIG. 29 is a cross-sectional illustration of the transmission detector module of FIG. 28, oriented completely perpendicular to an incident scanning x-ray beam for relatively lower resolution.
FIG. 30 is a cross-sectional view diagram similar to that of FIG. 29, except that the transmission detector module is rotated with respect to the incident scanning beam of x-rays, such that the system can obtain transmission x-ray images with higher resolution than in FIG. 29.

In FIG. 29, the scintillator strip is perpendicular to the incident beam direction and intercepts the entire beam, resulting in increased image SNR (more detected x-rays) but lower resolution along the scan direction.

In FIG. 30, the detector arm has been rotated such that the scintillator strip is presenting a narrower width to the incident beam, resulting in lower image SNR (and lower penetration through steel), but higher resolution along the scan direction.

The operator can therefore have the option to choose between higher SNR and lower resolution with the ability to image objects behind thicker steel, or to choose higher resolution with lower imager quality (lower SNR). The selection is made by rotating the detector arm relative to the incident beam, via a rotatable coupling between the detector arm and the coupling arm.

Figure 31:
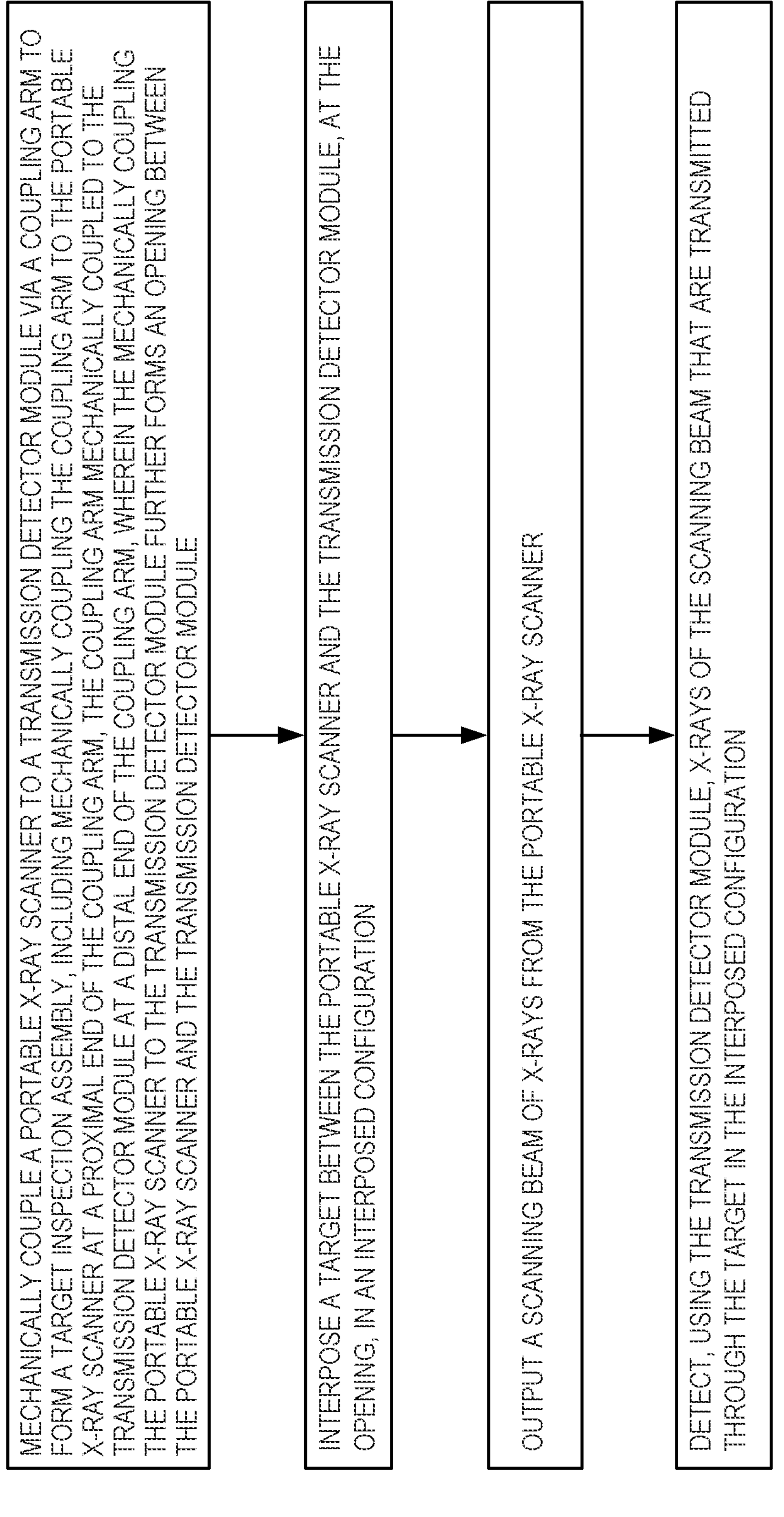
FIG. 31 is a flow diagram illustrating an embodiment target inspection method procedure.

FIG. 31 is a flow diagram illustrating an embodiment target inspection procedure. In particular, the procedure includes:

a) mechanically coupling a portable x-ray scanner to a transmission detector module via a coupling arm to form a target inspection assembly, including mechanically coupling the coupling arm to the portable x-ray scanner at a proximal end of the coupling arm, the coupling arm mechanically coupled to the transmission detector module at a distal end of the coupling arm, wherein the mechanically coupling the portable x-ray scanner to the transmission detector module further forms an opening between the portable x-ray scanner and the transmission detector module;

b) interposing a target between the portable x-ray scanner and the transmission detector module, at the opening, in an interposed configuration; outputting a scanning beam of x-rays from the portable x-ray scanner; and c) detecting, using the transmission detector module, x-rays of the scanning beam that are transmitted through the target in the interposed configuration.

It should be understood that the procedure of FIG. 31 can further include use or implementation of any of the features described in connection with FIGS. 24-30, such as rotating the transmission detector using a rotatable coupling in order to select a variable resolution for the transmission image.

While example embodiments have been particularly shown and described, it will be understood by those skilled in the art that various changes in form and details may be made therein without departing from the scope of the embodiments encompassed by the appended claims.

What is claimed is:

1. A target inspection system comprising:

a portable x-ray scanner configured to be handheld and to output a scanning beam of x-rays;

a transmission detector module configured to detect x-rays of the scanning beam of x-rays that are transmitted through a target when the target is interposed between the portable x-ray scanner and the transmission detector module; and a coupling arm configured to extend partially around the target and to couple the portable x-ray scanner to the transmission detector module mechanically to form a target inspection assembly, via a mechanical coupling between the coupling arm and the portable x-ray scanner at a proximal end of the coupling arm, and via a mechanical coupling between the coupling arm and the transmission detector module at a distal end of the coupling arm, the transmission detector module and the portable x-ray scanner mechanically coupled together via the coupling arm defining an opening configured to receive the target to be interposed therebetween for an x-ray scanning operation with the coupling arm extending partially around the target, wherein the coupling arm includes a mounting bracket configured for mechanically coupling the transmission detector module to the portable x-ray scanner, the mounting bracket being detachable from the portable x-ray scanner, the transmission detector module, or both.

2. The target inspection system of claim 1, wherein the transmission detector module is configured to be connected to the coupling arm at only one end.

3. The inspection system of claim 1, wherein the coupling arm is rigid.

4. The inspection system of claim 1, wherein the coupling arm is flexible.

5. The target inspection system of claim 1, wherein the transmission detector module is configured to have an effective active detection area that is adjustable with respect to a given field of the x-rays that are transmitted through the target.

6. The target inspection system of claim 1, wherein the mechanical coupling between the coupling arm and the transmission detector module is a rotational mechanical coupling that is configured to enable the transmission detector module to be rotated to adjust the effective active detection area.

7. The inspection system of claim 1, wherein the arm is spring loaded such that it remains disengaged from the inspection object or engaged with the inspection object absent application of external force.

8. The inspection system of claim 1, further including an actuator configured to move the arm into an engaged position with respect to the inspection object or into a disengaged position with respect to the inspection object.

9. The inspection system of claim 1, wherein a mechanism is configured to permit the arm to be mechanically decoupled from the portable x-ray scanner upon application of external force.

10. The inspection system of claim 1, wherein the coupling mechanism of the coupling arm to the scanner or the coupling arm to the transmission detector module includes a magnetic linkage.

11. The target inspection system of claim 1, wherein the coupling arm is mechanically coupled to the portable x-ray scanner at the proximal end of the coupling arm via a hinge mechanism.

12. The target inspection system of claim 11, wherein the hinge mechanism is configured to permit the coupling arm to be mechanically decoupled from the portable x-ray scanner upon application of external force.

13. The target inspection system of claim 12, wherein the hinge mechanism includes a magnetic linkage.

14. The target inspection system of claim 1, wherein the coupling arm is configured to be mechanically decoupled from the portable x-ray scanner, the transmission detector, or both.

15. The target inspection system of claim 1, wherein the coupling arm includes one or more adjustable joints situated between the proximal and distal ends of the coupling arm.

16. The target inspection system of claim 8, wherein the coupling arm includes two or more adjustable joints situated between the proximal and distal ends of the coupling arm.

17. The target inspection system of claim 1, wherein the portable x-ray scanner includes two or more connection points on different respective sides of the portable x-ray scanner.

18. The target inspection system of claim 1, wherein the transmission detector module includes a scintillator material configured to be mechanically coupled to the coupling arm.

19. The target inspection system of claim 18, wherein the scintillator material includes at least one strip of scintillator phosphor screen, the transmission detector module further including one or more ribbons of wavelength shifting fibers (WSFs) optically coupled to the at least one strip of scintillator phosphor screen.

20. The target inspection system of claim 19, the transmission detector module further including a photodetector, at least one end of a ribbon of the one or more ribbons of WSFs being optically coupled to the photodetector.

21. The target inspection system of claim 20, wherein the photodetector is a photomultiplier tube (PMT).

22. The target inspection system of claim 1, wherein the coupling arm has an adjustable length.

23. The target inspection system of claim 1, wherein the transmission detector module includes a non-pixelated detector that detects x-rays of the scanning beam that are transmitted through the target over a scan of the scanning beam.

24. The target inspection system of claim 1, wherein the transmission detector module is configured to provide information about a spectral content of the transmitted x-rays.

25. The target inspection system of claim 1, wherein the portable x-ray scanner includes a backscatter detector that is configured to detect x-rays of the scanning beam that are backscattered by the target.

26. The target inspection system of claim 1, further including an output interface configured to output image data for providing an image of the target for inspection of the target.

27. The target inspection system of claim 26, wherein the output interface is further configured to output transmission image data.

28. The target inspection system of claim 1, further including one or more lasers mounted at the portable x-ray scanner and configured to indicate a position of the scanning beam of x-rays for alignment of the transmission detector module with the scanning beam.

29. A method of target inspection, the method comprising:

mechanically coupling a portable x-ray scanner that is configured to be handheld to a transmission detector module via a coupling arm to form a target inspection assembly, including mechanically coupling the coupling arm to the portable x-ray scanner at a proximal end of the coupling arm, the coupling arm mechanically coupled to the transmission detector module at a distal end of the coupling arm, wherein the mechanically coupling the portable x-ray scanner to the transmission detector module further forms an opening between the portable x-ray scanner and the transmission detector module;

interposing a target between the portable x-ray scanner and the transmission detector module, at the opening, in an interposed configuration, with coupling arm extending partially around the target;

outputting a scanning beam of x-rays from the portable x-ray scanner; and detecting, using the transmission detector module, x-rays of the scanning beam that are transmitted through the target in the interposed configuration with the coupling arm extending partially around the target, wherein the coupling arm includes a mounting bracket configured for mechanically coupling the transmission detector module to the portable x-ray scanner, the mounting bracket being detachable from the portable x-ray scanner, the transmission detector module, or both.

30. A target inspection system comprising:

means for mechanically coupling a portable x-ray scanner that is configured to be handheld to a transmission detector module via a coupling arm to form a target inspection assembly, including mechanically coupling the coupling arm to the portable x-ray scanner at a proximal end of the coupling arm, the coupling arm mechanically coupled to the transmission detector module at a distal end of the coupling arm, wherein the mechanically coupling the portable x-ray scanner to the transmission detector module further forms an opening between the portable x-ray scanner and the transmission detector module;

means for interposing a target between the portable x-ray scanner and the transmission detector module with the coupling arm extending partially around the target, at the opening, in an interposed configuration;

means for outputting a scanning beam of x-rays from the x-ray scanner; and means for detecting, using the transmission detector module, x-rays of the scanning beam that are transmitted through the target in the interposed configuration with the coupling arm extending partially around the target, wherein the coupling arm includes a mounting bracket configured for mechanically coupling the transmission detector module to the portable x-ray scanner, the mounting bracket being detachable from the portable x-ray scanner, the transmission detector module, or both.

31. A target inspection system comprising:

a portable x-ray scanner configured to output a scanning beam of x-rays; and a transmission detector module configured to detect x-rays of the scanning beam of x-rays that are transmitted through a target when the target is interposed between the portable x-ray scanner and the transmission detector module, wherein the transmission detector module is configured to have an effective active detection area that is adjustable with respect to a given field of the x-rays that are transmitted through the target.

32. The target inspection system of claim 30, wherein the portable x-ray scanner is configured to be handheld.

33. The target inspection system of claim 31, wherein the portable x-ray scanner is configured to be handheld.

34. The target inspection system of claim 31, further including a rotational mechanical coupling between the portable x-ray scanner and the transmission detector module, the rotational coupling configured to enable the transmission detector module to be rotated to adjust the effective active detection area.

* * * * *